US010700504B2

(12) United States Patent
Nakamura et al.

(10) Patent No.: US 10,700,504 B2
(45) Date of Patent: Jun. 30, 2020

(54) ASSEMBLY COMPONENT OF COMPRESSION JOINT MEMBER, COMPRESSION JOINT STRUCTURE OF POWER-TRANSMISSION LINE AND METHOD OF CONSTRUCTING COMPRESSION JOINT MEMBER

(71) Applicants: SUMIDEN TRANSMISSION AND DISTRIBUTION SYSTEM PRODUCTS, LTD., Hyogo (JP); TOKYO ROPE MFG. CO., LTD., Tokyo (JP)

(72) Inventors: Mitsuhide Nakamura, Hyogo (JP); Akira Mano, Hyogo (JP); Kousuke Suzuki, Chiba (JP)

(73) Assignees: SUMIDEN TRANSMISSION AND DISTRIBUTION SYSTEM PRODUCTS, LTD., Hyogo (JP); TOKYO ROPE MFG. CO., LTD., Tokyo (JP)

( * ) Notice: Subject to any disclaimer, the term of this patent is extended or adjusted under 35 U.S.C. 154(b) by 0 days.

(21) Appl. No.: 16/033,590

(22) Filed: Jul. 12, 2018

(65) Prior Publication Data
US 2019/0020185 A1 Jan. 17, 2019

(30) Foreign Application Priority Data
Jul. 14, 2017 (JP) .................................. 2017-138476

(51) Int. Cl.
*H02G 7/02* (2006.01)
*H02G 7/20* (2006.01)
(Continued)

(52) U.S. Cl.
CPC ................. *H02G 7/02* (2013.01); *H02G 7/20* (2013.01); *H02G 7/04* (2013.01); *H02G 7/05* (2013.01); *H02G 7/056* (2013.01)

(58) Field of Classification Search
CPC .. H02G 7/02; H02G 7/04; H02G 7/05; H02G 7/056; H02G 7/20; H01R 4/20; H01R 4/5025; F16G 11/02
See application file for complete search history.

(56) References Cited

U.S. PATENT DOCUMENTS 2,446,542 A * 8/1948 MacInnes ................ H01R 4/56
174/94 R
3,213,186 A * 10/1965 Raila ...................... H01R 4/203
174/840

(Continued)

FOREIGN PATENT DOCUMENTS

JP   H0584135 U  * 11/1993  ............... H02G 7/02
JP   09322367 A  * 12/1997  ............... H02G 7/02
JP   2000-278848    10/2000

*Primary Examiner* — Paresh H Paghadal
(74) *Attorney, Agent, or Firm* — IPUSA, PLLC

(57) ABSTRACT

An assembly component of a compression joint member that connects a power-transmission line to a connection target, includes a core portion compression member including a housing hole that houses an end portion of the core portion, and a compression portion that is compressed for compressing and connecting the end portion of the core portion housed in the housing hole; and a conductive portion compression member that houses an end portion of the conductive portion and the core portion compression member, and is to be compressed with the end portion of the conductive portion and the core portion compression member, wherein the compression portion includes an inclined portion provided at an opening side of the housing hole and whose outer diameter becomes smaller toward the opening side of the housing hole.

12 Claims, 12 Drawing Sheets

(51) Int. Cl.
*H02G 7/05* (2006.01)
*H02G 7/04* (2006.01)

(56) References Cited

U.S. PATENT DOCUMENTS

| | | | | |
|---|---|---|---|---|
| 6,015,953 | A * | 1/2000 | Tosaka | H01R 4/20 |
| | | | | 174/79 |
| 6,805,596 | B2 * | 10/2004 | Quesnel | H01R 11/09 |
| | | | | 174/840 |
| 9,257,760 | B2 * | 2/2016 | Crutcher | H01R 4/5025 |
| 2003/0194916 | A1 * | 10/2003 | Quesnel | H01R 11/09 |
| | | | | 439/784 |
| 2007/0062718 | A1 * | 3/2007 | De France | H01R 4/5025 |
| | | | | 174/84 C |
| 2012/0305312 | A1 * | 12/2012 | McCullough | F16G 11/02 |
| | | | | 174/75 R |
| 2015/0075837 | A1 * | 3/2015 | Welborn | H01R 43/20 |
| | | | | 174/90 |

* cited by examiner

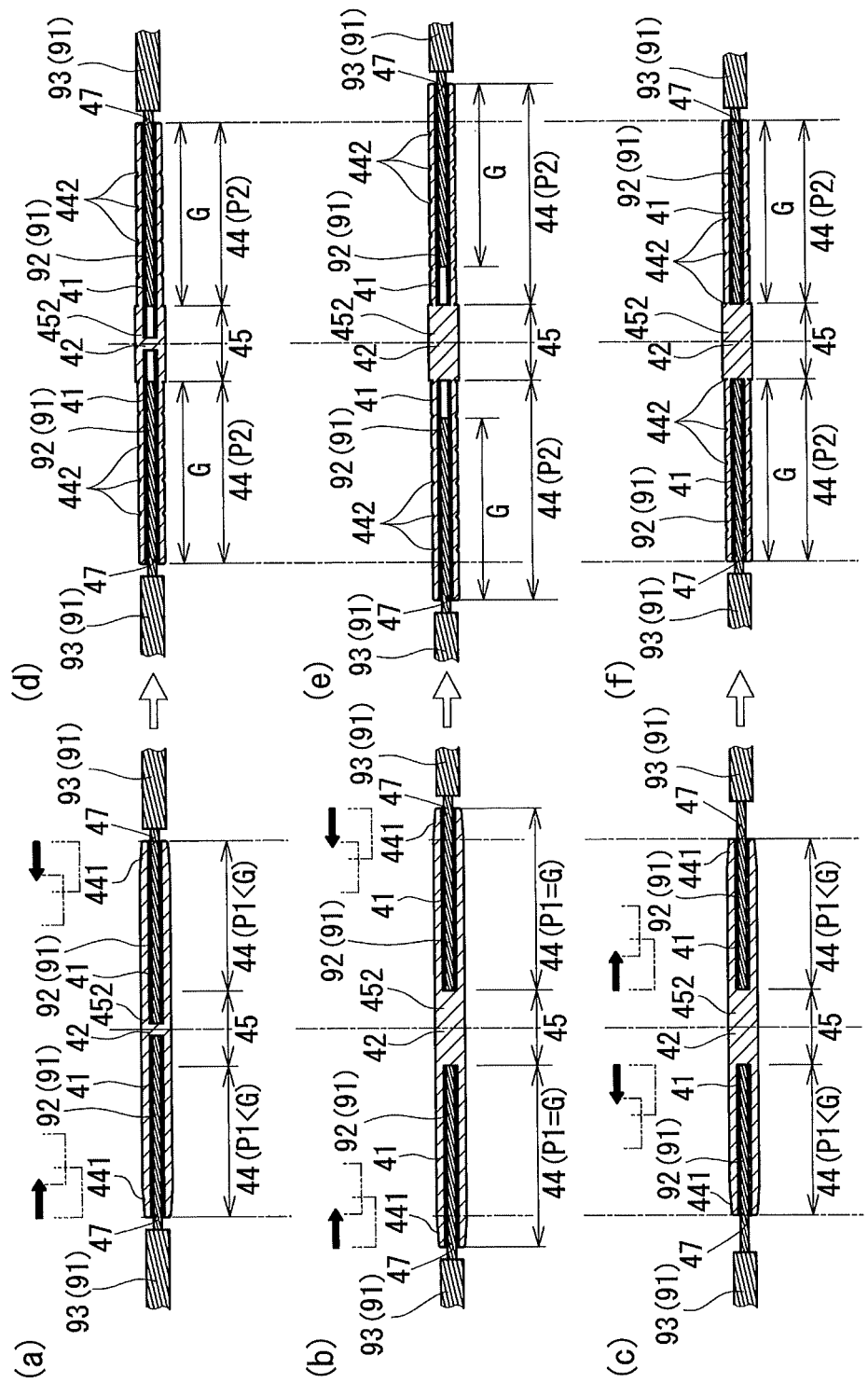

ASSEMBLY COMPONENT OF COMPRESSION JOINT MEMBER, COMPRESSION JOINT STRUCTURE OF POWER-TRANSMISSION LINE AND METHOD OF CONSTRUCTING COMPRESSION JOINT MEMBER

BACKGROUND OF THE INVENTION

1. Field of the Invention

The present invention relates to an assembly component of a compression joint member, a compression joint structure of a power-transmission line and a method of constructing a compression joint member.

CROSS-REFERENCE TO RELATED APPLICATION

The present application is based on and claims the benefit of priority of Japanese Priority Application No. 2017-138476 filed on Jul. 14, 2017, the entire contents of which are hereby incorporated by reference.

As an aerial power-transmission line, a steel-cored aluminum cable (ACSR: Aluminum Conductor Steel Reinforced) is used in which a plurality of aluminum (Al) lines are stranded around an outer periphery of a steel-core in which steel wires are stranded. The ACSR is anchored to an insulator of a steel tower by a compression type anchor clamp (compression joint member) including a steel sleeve (core portion compression member) that houses, compresses and connects a steel-core, whose end portion is exposed by partially peeling, and an Al sleeve (conductive portion compression member) that houses, compresses and connects the steel sleeve and an Al wire (Patent Document 1, for example).

PATENT DOCUMENT

[Patent Document 1] Japanese Laid-open Patent Publication No. 2000-278848

SUMMARY OF THE INVENTION

According to the disclosure, there is provided an assembly component of a compression joint member that connects a power-transmission line to a connection target, the power-transmission line including a core portion in which a plurality of element wires each of whose main constituent is carbon fiber are stranded, and a conductive portion in which a plurality of element wires each of whose main constituent is aluminum are stranded at an outer periphery of the core portion. The assembly component of the compression joint member includes a core portion compression member including a housing hole that houses an end portion of the core portion, and a compression portion that is compressed for compressing and connecting the end portion of the core portion housed in the housing hole; and a conductive portion compression member that houses an end portion of the conductive portion and the core portion compression member, and is to be compressed with the end portion of the conductive portion and the core portion compression member, wherein the compression portion includes an inclined portion provided at an opening side of the housing hole and whose outer diameter becomes smaller toward the opening side of the housing hole.

According to the disclosure, there is provided a compression joint structure of a power-transmission line including a power-transmission line including a core portion in which a plurality of element wires each of whose main constituent is carbon fiber are stranded, and a conductive portion in which a plurality of element wires each of whose main constituent is aluminum are stranded at an outer periphery of the core portion; and a compression joint member that connects an end portion of the power-transmission line at which the core portion is exposed from the conductive portion with a connection target by compressing the end portion, wherein the compression joint member includes a core portion compression member including a compression portion that is plastically deformed by the compression, and holds the end portion of the core portion in the compression portion, and a conductive portion compression member that holds an end portion of the conductive portion with the core portion compression member that holds the end portion of the core portion, and wherein the compression portion includes an inclined portion provided at a front end side of the core portion compression member and whose outer diameter becomes smaller toward the front end side.

According to the disclosure, there is provided a method of constructing a compression joint member, including preparing the above assembly component of the compression joint member; connecting an end portion of the core portion that is exposed by partially peeling an end portion of the power-transmission line with the core portion compression member by housing the end portion of the core portion in the housing hole of the core portion compression member and compressing the compression portion of the core portion compression member; connecting an end portion of the conductive portion and the core portion compression member with the conductive portion compression member by housing the core portion compression member to which the end portion of the core portion is connected and the end portion of the conductive portion in the conductive portion compression member, and compressing the conductive portion compression member; and connecting the power-transmission line to a connection target by using the assembly component of the compression joint member, the power-transmission line including a core portion in which a plurality of element wires each of whose main constituent is carbon fiber are stranded, and a conductive portion in which a plurality of element wires each of whose main constituent is aluminum are stranded at an outer periphery of the core portion.

BRIEF DESCRIPTION OF THE DRAWINGS

FIG. 12 is a view schematically illustrating a method of constructing the compression joint member of the third embodiment.

DETAILED DESCRIPTION OF THE PREFERRED EMBODIMENTS

Figure 1:
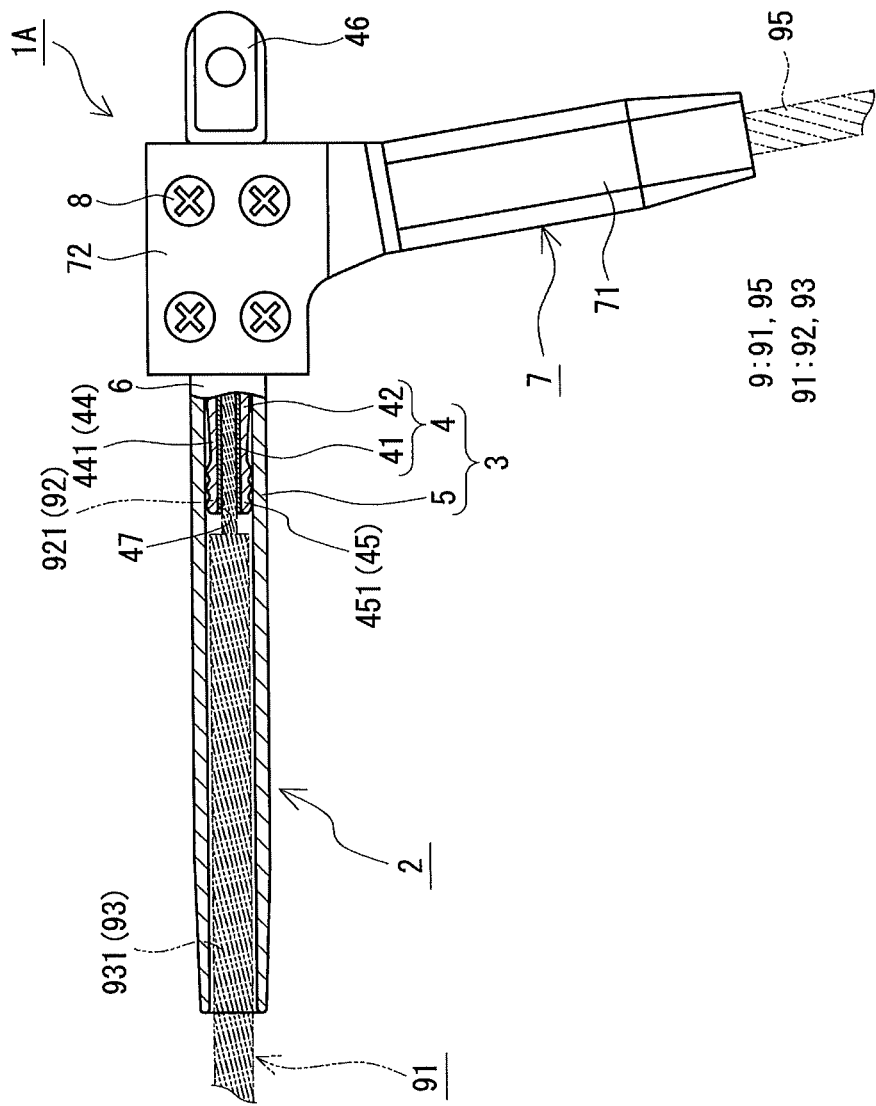
FIG. 1 is a partial cross-sectional view schematically illustrating an assembly component of a compression joint member of a first embodiment.

The ACSR may become slack when the temperature of the steel wire increase and the steel wire thermally expands in accordance with increasing of temperature of the Al wire when a current is flowing through the ACSR. As a power-transmission line that does not easily thermally expand and is not easily loosened, compared with the ACSR, a carbon fiber-cored aluminum cable is known that uses a CFRP (Carbon Fiber Reinforced Plastic) strand instead of the steel-core. In other words, the carbon fiber-cored aluminum cable is constituted by stranding a plurality of Al wires at an outer periphery of the CFRP strand. The CFRP strand is configured by stranding a plurality of element wires made of Carbon Fiber Reinforced Plastic (CFRP) constituted by carbon fiber and resin.

Compared with a steel wire of the ACSR, a CFRP strand of the carbon fiber-cored aluminum cable and the like do not easily thermally expand and is not easily loosened. However, the CFRP strand does not have high compression resistance. Thus, similar to the ACSR, it is difficult to compress and connect the CFRP strand by the steel sleeve for anchoring the CFRP strand to the steel tower. Normally, the steel sleeve includes a tubular portion whose inner diameter and outer diameter are respectively constant in the axial direction, and is compressed after housing a steel core in the tubular portion. Thus, when the CFRP strand is compressed and connected by the steel sleeve, in particular, the CFRP strand collapse at an open end side of the steel sleeve to lower holding force, and sufficient tensile strength cannot be obtained.

Description of Embodiment

First, embodiments of the invention are described.

(1) An assembly component of a compression joint member of an embodiment that connects a power-transmission line to a connection target, the power-transmission line including a core portion in which a plurality of element wires each of whose main constituent is carbon fiber are stranded, and a conductive portion in which a plurality of element wires each of whose main constituent is aluminum are stranded at an outer periphery of the core portion, the assembly component of the compression joint member includes a core portion compression member including a housing hole that houses an end portion of the core portion, and a compression portion that is compressed for compressing and connecting the end portion of the core portion housed in the housing hole; and a conductive portion compression member that houses an end portion of the conductive portion and the core portion compression member, and is to be compressed with the end portion of the conductive portion and the core portion compression member, wherein the compression portion includes an inclined portion provided at an opening side of the housing hole and whose outer diameter becomes smaller toward the opening side of the housing hole.

According to the above described structure, even when the core portion compression member that houses the core portion is directly compressed, high tensile strength can be obtained without collapsing the core portion. When the compression portion of the core portion compression member is compressed, as compressive force moderately acts on the inclined portion, inordinate compressive force is suppressed from acting on the core portion at the end portion of the compression portion at the opening side, and collapse of the core portion at the end portion of the compression portion at the opening side can be suppressed.

(2) As an embodiment of the assembly component of the compression joint member, the length of the inclined portion may be greater than or equal to ½ of an outer diameter of the core portion compression member and less than or equal to twice of the outer diameter of the core portion compression member.

When the length of the inclined portion is greater than or equal to ½ of an outer diameter of the core portion compression member, inordinate compressive force is easily suppressed from acting on the core portion at the front end of the core portion compression member. When the length of the inclined portion less than or equal to twice of the outer diameter of the core portion compression member, the length of the inclined portion does not become too long, compression can be sufficiently performed along the axial direction of the core portion compression member to increase holding force, and high tensile strength can be obtained.

(3) As an embodiment of the assembly component of the compression joint member, the core portion compression member may include a fitting portion, provided at the opening side of the housing hole with respect to the compression portion, that fits with the conductive portion compression member by the compression of the conductive portion compression member.

According to the above described structure, when the conductive portion compression member is compressed, positional shift between the core portion compression member and the conductive portion compression member in the axial direction can be easily prevented.

(4) As an embodiment of the assembly component of the compression joint member, the core portion compression member may include a non-compression portion, provided at an opposite side of the opening side of the housing hole such that the compression portion is interposed between the opening side of the housing hole and the non-compression portion, that is not compressed with the end portion of the core portion.

According to the above described structure, the housing hole can be continuously formed from the front end of the core portion compression member to a further rear end side with respect to the compression portion.

(5) As an embodiment of the assembly component of the compression joint member in which the core portion compression member includes a non-compression portion, the housing hole may be continuously formed from a front end of the core portion compression member to extend over the non-compression portion, and a length of the housing hole in the non-compression portion may be longer than or equal to an extending amount of the core portion compression member in the axial direction when the compression portion is compressed from the opening side.

According to the above described structure, even when the compression portion is separately compressed for a plurality of times from the opening side to the bottom side of the housing hole (reverse-compression), the core portion compression member after compression does not become too long. Thus, the compression joint structure of the power-transmission line does not become large. This will be described in detail in the following embodiments.

(6) A compression joint structure of a power-transmission line of an embodiment includes a power-transmission line including a core portion in which a plurality of element wires each of whose main constituent is carbon fiber are stranded, and a conductive portion in which a plurality of element wires each of whose main constituent is aluminum are stranded at an outer periphery of the core portion; and a compression joint member that connects an end portion of the power-transmission line at which the core portion is exposed from the conductive portion with a connection target by compressing the end portion, wherein the compression joint member includes a core portion compression member including a compression portion that is plastically deformed by the compression, and holds the end portion of the core portion in the compression portion, and a conductive portion compression member that holds an end portion of the conductive portion with the core portion compression member that holds the end portion of the core portion, and wherein the compression portion includes an inclined portion provided at a front end side of the core portion compression member and whose outer diameter becomes smaller toward the front end side.

According to the above described structure, bonding strength between the power-transmission line and the compression joint member is high. This is because the core portion and the core portion compression member can be connected without collapsing the core portion. As including the inclined portion, when compressing the core portion compression member in the construction process, when the inclined portion is compressed, compressive force moderately acts on the inclined portion. Thus, inordinate compressive force is suppressed from acting on the core portion at the opening side of the compression portion of the core portion compression member.

(7) As an embodiment of the compression joint structure of the power-transmission line, the core portion compression member may include a fitting portion, provided at the front end side with respect to the compression portion, that fits with an inner peripheral surface of the conductive portion compression member.

According to the above described structure, positional shift between the core portion compression member and the conductive portion compression member in the axial direction can be easily prevented.

(8) As an embodiment of the compression joint structure of the power-transmission line, the core portion compression member may include a non-compression portion, provided at an opposite side of the front end side such that the end portion of the core portion is interposed between the front end side and the non-compression portion, does not adhere to the core portion.

According to the above described structure, by including the non-compression portion, a fitting shape can be formed at an outer peripheral surface of the non-compression portion that can engage with an inner peripheral surface of the conductive portion compression member that is provided outside of the non-compression portion. With this, positional shift between the core portion compression member and the conductive portion compression member in the axial direction can be suppressed.

(9) As an embodiment of the compression joint structure of the power-transmission line in which the core portion compression member includes a non-compression portion, the non-compression portion may include an inner peripheral surface that forms a gap portion through which the front end of the core portion is not inserted.

According to the above described structure, the compression joint structure of the power-transmission line does not become large. This is because, as the gap portion is formed in the non-compression portion, the core portion compression member in which the housing hole that houses the end portion of the core portion is formed to extend over the non-compression portion is used in the construction process and the reverse-compression is performed. This will be described in detail in the following embodiments.

(10) As an embodiment of the compression joint structure of the power-transmission line, the compression portion may include three or more compression traces formed to align in an axial direction of the compression portion, and an interval between adjacent compression traces of the compression portion may be the longest at the inclined portion side.

According to the above described structure, bonding strength between the power-transmission line and the compression joint member is high. This is because the power-transmission line and the compression joint member can be connected without collapsing the core portion at the end portion of the compression portion at the opening side. As an interval between adjacent compression traces of the compression portion at the opening side is the longest, the compression portion is compressed from the inclined portion at the opening side in the construction process. Thus, inordinate compressive force is suppressed from acting on the cote portion at the end portion of the compression portion at the opening side in the construction process, and collapse of the core portion at the end portion of the compression portion at the opening side is suppressed.

(11) A method of constructing the compression joint member of an embodiment, includes preparing the assembly component of the compression joint member according to any one of above described (1) to (5); connecting an end portion of the core portion that is exposed by partially peeling an end portion of the power-transmission line with the core portion compression member by housing the end portion of the core portion in the housing hole of the core portion compression member and compressing the compression portion of the core portion compression member; connecting an end portion of the conductive portion and the core portion compression member with the conductive portion compression member by housing the core portion compression member to which the end portion of the core portion is connected and the end portion of the conductive portion in the conductive portion compression member, and compressing the conductive portion compression member; and connecting the power-transmission line to a connection target by using the assembly component of the compression joint member, the power-transmission line including a core portion in which a plurality of element wires each of whose main constituent is carbon fiber are stranded, and a conductive portion in which a plurality of element wires each of whose main constituent is aluminum are stranded at an outer periphery of the core portion.

According to the above described structure, by using the above described assembly component of the compression joint member, when the compression portion of the core portion compression member is compressed, compressive force moderately acts on the inclined portion. Thus, inordinate compressive force can be suppressed from acting on the core portion at the end portion of the housing hole of the compression portion at the opening side, and collapse of the core portion at the end portion of the compression portion at the opening side can be suppressed. With this, as high tensile strength can be obtained, the compression joint structure of the power-transmission line in which the bonding strength between the power-transmission line and the compression joint member is high can be constructed.

(12) As an embodiment of the method of constructing the compression joint member, in the connecting the end portion of the core portion, the core portion compression member may be compressed for a plurality of times from the inclined portion side in the axial direction of the core portion compression member According to the above described structure, by separately compressing for a plurality of times in the axial direction, damage to the core portion can be easily suppressed. By increasing the divided number in the axial direction, each compression width can be made smaller, and damage to the core portion can be easily suppressed. The narrower the compression width is, the smaller the degree of deformation of the core portion compression member in each compression becomes, and shorter a spread of the core portion compression member in the axial direction becomes. Thus, force of an action in the axial direction of the core portion by the deformation of the core portion compression member can be made small.

Further, by compressing the core portion compression member from the inclined portion side, even when the length of the housing hole of the core portion compression member varies, it is easy to maintain a constant compression of the core portion at the end portion of the compression portion at the opening side (inclined portion). Thus, compared with a case when the core portion compression member is compressed from an opposite side of the inclined portion, it is unnecessary to adjust the compression width in order to suppress damage to the core portion at the end portion of the compression portion at the opening side.

(13) As an embodiment of the method of constructing the compression joint member, a compressibility ratio in the connecting the end portion of the core portion may be greater than or equal to 5% and less than or equal to 15%.

When the compressibility ratio is greater than or equal to 5%, the core portion and the core portion compression member can be sufficiently connected. When the compressibility ratio is less than or equal to 15%, the compressive force that acts on the core portion does not become too large, and collapse of the core portion can be suppressed.

Detail of Embodiments

The embodiment of the invention is described in detail. The same numerals in the drawings illustrate the same components. In the following, an assembly component of a compression joint member, a compression joint structure of a power-transmission line and a method of constructing a compression joint member are described in this order.

First Embodiment (Assembly Component of Compression Joint Member)

Figure 2:
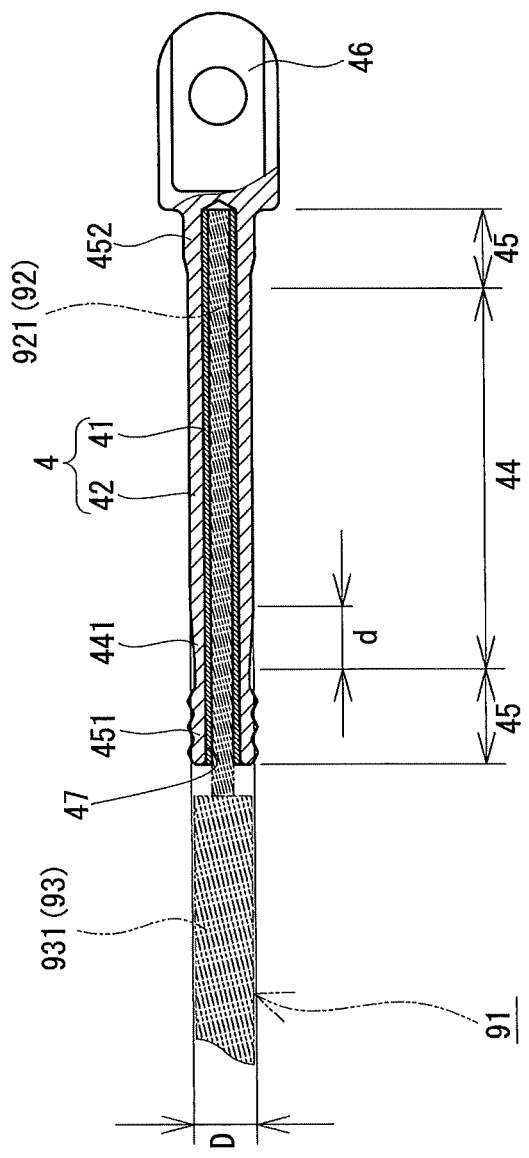
FIG. 2 is a partial cross-sectional view schematically illustrating a core portion compression member included in the assembly component of the compression joint member of the first embodiment.
Figure 3:
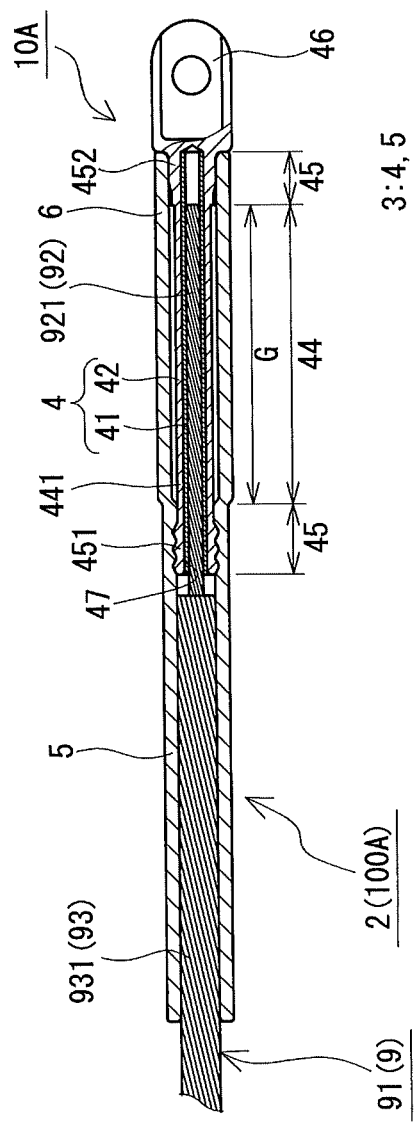
FIG. 3 is a partial cross-sectional view schematically illustrating a compression joint structure of a power-transmission line of the first embodiment.
Figure 4:
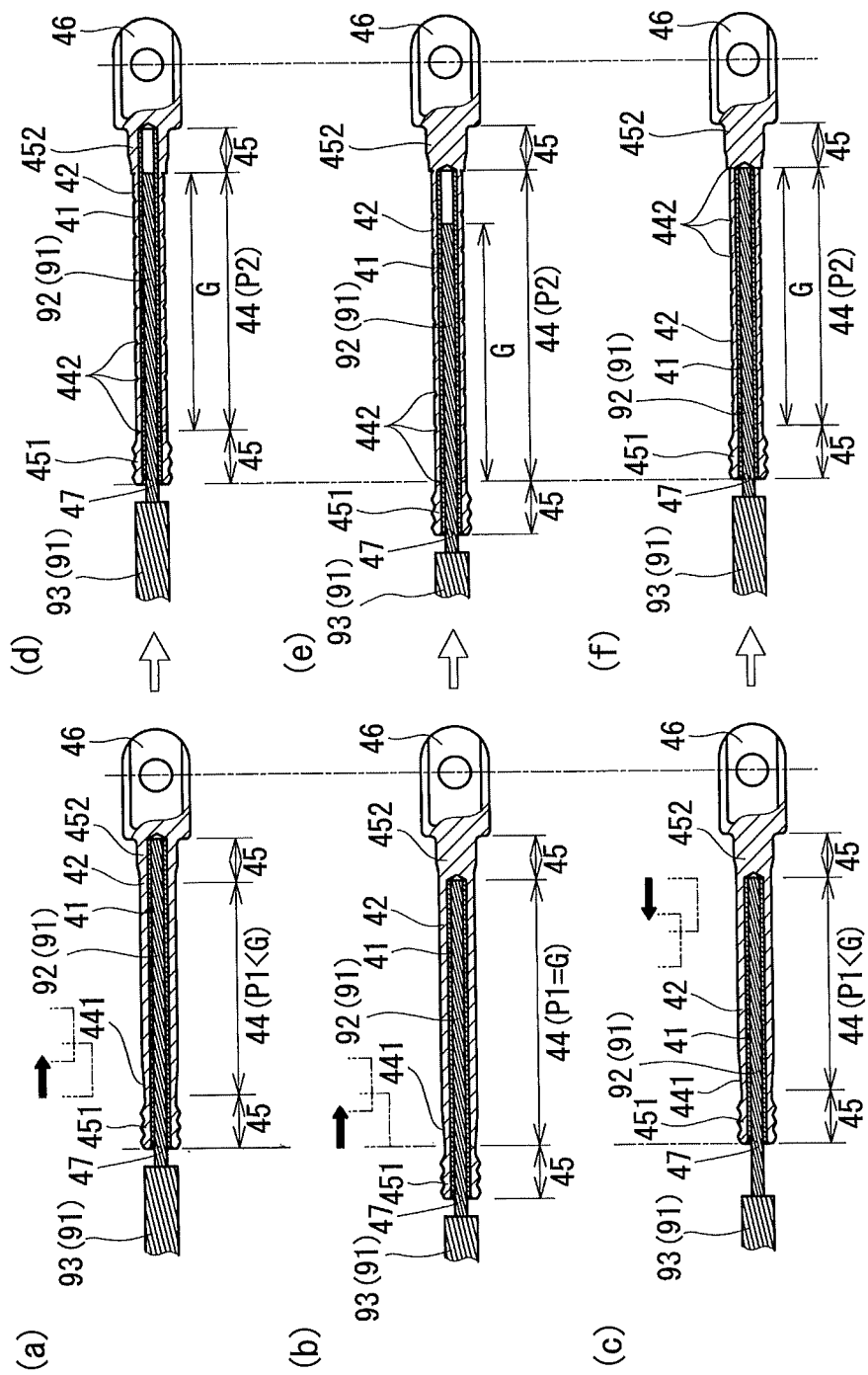
FIG. 4 is a view schematically illustrating a method of constructing the compression joint member of the first embodiment.

An assembly component 1A of a compression joint member of the first embodiment is described mainly with reference to FIG. 1 and FIG. 2 (also FIG. 3 and FIG. 4). FIG. 1 and FIG. 2 illustrate the assembly component 1A of the compression joint member before compression. The assembly component 1A of the compression joint member connects a power-transmission line 9 to a connection target. The connection target of the power-transmission line 9 may be an insulator of a steel tower or another power-transmission line (main line)(not illustrated), and a type of the assembly component 1A of the compression joint member may be selectable based on the connection target of the power-transmission line 9. When the connection target of the power-transmission line 9 is an insulator of a steel tower, as the assembly component 1A of the compression joint member, a compression type anchor clamp may be exemplified. Alternatively, when the connection target of the power-transmission line 9 is another power-transmission line, as the assembly component 1A of the compression joint member, a compression type straight sleeve may be exemplified. In this example, an example is described in which the assembly component 1A of the compression joint member is provided between the power-transmission line 9 and a steel tower, and the compression joint member is a compression type anchor clamp that connects the power-transmission line 9 to the insulator of the steel tower.

The assembly component 1A of the compression joint member of the example is a sheave passing short length compression type anchor clamp that includes a clamp main body 2 that holds the main line 91 of the power-transmission line 9, and a jumper socket 7 that holds a jumper wire 95 and is electrically and mechanically connected to the clamp main body 2 such that to intersect the clamp main body 2. With this connection, the main line 91 and the jumper wire 95 are electrically connected. The main line 91 includes a core portion 92 in which a plurality of (here, seven) element wires 921 each of whose main constituent is a carbon fiber are stranded, and a conductive portion 93 in which a plurality of element wires 931 each of whose main constituent is aluminum (Al) are stranded at an outer periphery of the core portion 92 (typically, a carbon fiber-cored aluminum cable). The jumper wire 95 may be constituted by an Al strand. The clamp main body 2 includes a core portion compression member 4 that compresses and connects an end portion of the core portion 92, and a conductive portion compression member 5 that compresses and connects an end portion of the conductive portion 93. One of features of the assembly component 1A of the compression joint member is that the core portion compression member 4 includes an inclined portion 441 at a specific position of a compression portion 44 that is compressed to be connected with the core portion 92. This is described in detail in the following.

(Clamp Main Body)

The clamp main body 2 includes a compression holding portion 3 that is compressed with the main line 91 and holds the main line 91, and a main body-side connection portion 6 that is connected to the jumper socket 7 (FIG. 1).

(Compression Holding Portion)

The compression holding portion 3 includes, from an inner side in order, the core portion compression member 4 and the conductive portion compression member 5.

(Core Portion Compression Member)

The core portion compression member 4 holds the end portion of the core portion 92. The core portion compression member 4 may be constituted by a single member, or may be constituted by a plurality of members. Here, the core portion compression member 4 includes an inner pipe 41 that houses the end portion of the core portion 92, and an outer sleeve 42 that houses the inner pipe 41 with the end portion of the core portion 92. The core portion compression member 4 may not include the inner pipe 41, and may be constituted only by the outer sleeve 42.

(Inner Pipe)

When the outer sleeve 42 is compressed, the inner pipe 41 suppresses collapse of the core portion 92 and connects the core portion 92 and the outer sleeve 42. The inner pipe 41 is a cylindrical member that houses the core portion 92 and is continuously provided in its cylindrical direction without a gap. As the inner pipe 41 is continuously provided in its cylindrical direction without a gap, when the compressive force to the outer sleeve 42 acts on the inner pipe 41 via the outer sleeve 42, the inner pipe 41 can be deformed while moderating the compressive force and easily enters strand grooves of the core portion 92 without collapsing the core portion 92. The inner pipe 41 has an inner peripheral surface and an outer peripheral surface whose inner diameter and outer diameter in the axial direction are constant, respectively.

It is preferable that a material of the inner pipe 41 is pure aluminum (Al) or an Al alloy whose Vickers hardness "Hv" is less than or equal to 30. When the Vickers hardness "Hv" of the inner pipe 41 is less than or equal to 30, the inner pipe 41 is easily deformed via the outer sleeve 42 when the outer sleeve 42 is compressed. Thus, the inner pipe 41 easily adheres to the core portion 92 in addition to easily moderating an action of the compressive force on the core portion 92. By constituting the inner pipe 41 by pure Al or an Al alloy, by the action of the compressive force to the inner pipe 41, appropriate work hardening sufficient to strongly hold the core portion 92 can be obtained. Thus, even when the outer sleeve 42 is directly compressed, the core portion 92 and the outer sleeve 42 can be connected without collapsing the core portion 92, and high tensile strength can be obtained.

Although a lower limit value of the Vickers hardness "Hv" is not specifically limited, practically, it is preferable to be greater than or equal to 15. When the Vickers hardness "Hv" of the inner pipe 41 is greater than or equal to 15, when compressing the outer sleeve 42, inordinate deformation of the inner pipe 41 can be easily suppressed. Thus, damage to the core portion 92 due to the inordinate deformation of the inner pipe 41 can be easily suppressed. It is particularly preferable that the Vickers hardness "Hv" is greater than or equal to 15 and less than or equal to 25, for example. Content of Al in pure Al is greater than or equal to 99.0 mass %, and 1000 series, for example, such as tempers "O" and "H14" of A1050, A1070 and A1100, defined by "JIS H 4000 (2014) 'Aluminum and aluminum alloy sheets, strips and plates'", and a sample obtained by performing a heat treatment on them may be exemplified. As the Al alloy, for example, a sample obtained by performing a heat treatment on A5052, A6061, A6063 and the like may be exemplified.

When compressing the outer sleeve 42, the inner pipe 41 can, by being deformed by the compressive force via the outer sleeve 42, moderate an action of the compressive force on the core portion 92 and suppress collapse of the core portion 92. In addition, the inner pipe 41 can, by entering the strand grooves of the core portion 92 by the deformation, fill spaces between the inner pipe 41 and the core portion 92 and adhere to the core portion 92. Thus, the inner pipe 41 can form a mechanically stronger bonding state with the core portion 92. Thus, high tensile strength can be obtained. In addition, it is expected that the inner pipe 41 shows work hardening sufficient to ensure tensile strength against tensile force by the power-transmission line 9.

It is preferable that a thickness of the inner pipe 41 is greater than or equal to ½ times and less than or equal to 3/2 times of a diameter of the element wire 921 of the core portion 92. When the thickness of the inner pipe 41 is greater than or equal to ½ times of the diameter of the element wire 921, when the inner pipe 41 is deformed by compressing the outer sleeve 42, it is easy to fill the strand grooves of the core portion 92 by the deformed inner pipe 41, and it is easy to fill spaces between the core portion 92 and the inner pipe 41. When the thickness of the inner pipe 41 is less than or equal to 3/2 times of the diameter of the element wire 921, the inner pipe 41 can be easily deformed when compressing the outer sleeve 42. In addition, the inner pipe 41 is not too thick, and the assembly component 1A of the compression joint member can be suppressed from becoming large. It is particularly preferable that the thickness of the inner pipe 41 is greater than or equal to ½ times and less than or equal to one time of the diameter of the element wire 921. It is preferable, for example, that the thickness of the inner pipe 41 is greater than or equal to 1.0 mm and less than or equal to 5.0 mm, and particularly preferably, greater than or equal to 1.0 mm and less than or equal to 3.0 mm.

It is preferable that a difference between an inner diameter of the inner pipe 41 and a diameter of a circumcircle of the core portion 92 is smaller. With this, when the inner pipe 41 is deformed by compressing the outer sleeve 42, it is easy to fill the strand grooves of the core portion 92 by the deformed inner pipe 41, and it is easy to fill spaces between the core portion 92 and the inner pipe 41. It is preferable that the difference between the inner diameter of the inner pipe 41 and the diameter of a circumcircle of the core portion 92 is less than or equal to ⅕ times of the diameter of a circumcircle of the core portion 92, and particularly preferably, approximately less than or equal to 1/10 times, for example.

The inner pipe 41 may have a length that is substantially equal to or greater than a length "P1" (FIG. 4) of the compression portion 44 (which will be described later) of the outer sleeve 42. The length of the inner pipe 41 may be, when the inner pipe 41 is housed in the housing hole 47 of the outer sleeve 42 such that to contact a bottom of the housing hole 47, greater than or equal to a length from the bottom of the housing hole 47 to the end portion of the housing hole 47 at the compression portion 44 at the opening side. Here, the length of the inner pipe 41 is set to be the same as the entire length of the housing hole 47 (substantially the same as the length of the housing hole 47).

(Outer Sleeve)

The outer sleeve 42 holds the end portion of the core portion 92. In this example, the outer sleeve 42 is compressed under a state that the end portion of the core portion 92 and the inner pipe 41 are housed in the outer sleeve 42. As a material of the outer sleeve 42, steel may be exemplified. The outer sleeve 42 includes a compression portion 44 and non-compression portions 45 that are housed in the conductive portion compression member 5 and the main body-side connection portion 6, and an attaching portion 46 that protrudes outside from the conductive portion compression member 5 and the main body-side connection portion 6, which will be described later. The housing hole 47 that is open at the front end of the outer sleeve 42 and houses the end portion of the core portion 92 and the inner pipe 41 is formed in the outer sleeve 42 (FIG. 2).

(Compression Portion)

The compression portion 44 is compressed to further compress and connect the end portion of the core portion 92 housed in the housing hole 47 when connecting the end portion of the core portion 92 with the outer sleeve 42. Although the compression portion 44 is mainly compressed with the core portion 92, depending on the length of the housing hole 47 and a compression order, the compression portion 44 may include a part that is compressed but does not include the core portion 92. The compression portion 44 is a part of the outer sleeve 42 other than the non-compression portions 45 among a region housed in the conductive portion compression member 5 and the main body-side connection portion 6. The compression portion 44 is constituted by the inclined portion 441 (which will be described later) that is formed at the opening side of the housing hole 47, and a linear portion that is formed at an opposite side of the opening side of the housing hole 47 with respect to the inclined portion 441. An outer peripheral outline shape (cross-sectional shape) of the linear portion is a circular (cylindrical) shape, and its outer diameter is constant in the axial direction. The compression portion 44 is formed at a region other than the non-compression portions 45, except the attaching portion 46. In this example, the compression portion 44 is formed only between the non-compression portions 45, which will be described later.

The length "P1" (FIG. 4) of the compression portion 44 in the axial direction of the outer sleeve 42 is appropriately determined based on whether the compression order of the outer sleeve 42 is forward-compression or reverse-compression, and a length of the housing hole 47, which will be described later. Forward-compression means to compress the outer sleeve 42 for multiple times from a bottom side toward an opening side of the housing hole 47 along the axial direction of the outer sleeve 42. Reverse-compression means to compress the outer sleeve 42 for multiple times from the opening side toward the bottom side of the housing hole 47 along the axial direction of the outer sleeve 42. Specifically, the length "P1" of the compression portion 44 may be appropriately selected for the following conditions (1) and (3), and the following condition (2).

The condition (1) means that the compression order is the reverse-compression, and the housing hole 47 is formed from the front end of the outer sleeve 42 to extend over the non-compression portion 45 at the attaching portion 46 side (rear side) ((a) of FIG. 4). At this time, the length of the housing hole 47 is longer than that of the condition (3), which will be described in the following. The length of the housing hole 47 at the non-compression portion 45 is set to be equal to or longer than the extending amount of the outer sleeve 42 in the axial direction of the outer sleeve 42 when the compression portion 44 is compressed from the opening side of the housing hole 47 toward the bottom side.

The condition (2) means that the compression order is the reverse-compression, and the housing hole 47 has a length from the front end of the outer sleeve 42 to the end portion of the compression portion 44 at the rear end side ((b) of FIG. 4). At this time, the length of the housing hole 47 is longer than that of the condition (3).

The condition (3) means that the compression order is the forward-compression, and the housing hole 47 has a length from the front end of the outer sleeve 42 to the end portion of the compression portion 44 at the rear end side ((c) of FIG. 4).

Under the condition (1) or the condition (3), the length "P1" of the compression portion 44 before compression can be made shorter than a required holding length as long as the compression portion 44 after compression satisfies "the compressed holding length "G"≥ the required holding length". Thus, the outer sleeve 42 after compressing the compression portion 44 does not become too long, and the compression joint structure 10A of the power-transmission line (FIG. 3) does not become large. The compressed holding length "G" means a length at which the outer sleeve 42 holds the core portion 92 after compression. The required holding length means the minimum compressed holding length for obtaining predetermined tensile strength.

For the condition (1) by which the reverse-compression is performed, it is preferable that the length "P1" of the compression portion 44 before compression is set such that the compression portion 44 after compression satisfies "the compressed holding length "G"=the length "P2" of the compression portion after compression". By adjusting the length of the housing hole 47, which will be described later, the length "P1" of the compression portion 44 before compression may be set such that the compression portion 44 after compression satisfies "the compressed holding length "G"=the length "P2" of the compression portion 44 after compression". Meanwhile, for the condition (2), in order for the compression portion 44 after compression to satisfy the "the compressed holding length "G"≥ the required holding length", it is necessary for the length "P1" of the compression portion 44 before compression to be at least the required holding length. This is described in detail later.

(Inclined Portion)

The inclined portion 441 suppresses an action of inordinate compressive force on the core portion 92 when the end portion of the core portion 92 is connected by the outer sleeve 42. The inclined portion 441 includes an inclined surface whose outer diameter becomes smaller toward an opening side of the housing hole 47 (FIG. 2). It is preferable that the inclined portion 441 is formed at the front end ((a), (b) and (c) of FIG. 2) of the compression portion 44. With this, collapse of the core portion 92 at the front end of the compression portion 44 can be easily suppressed. The inclined portion 441 of the embodiment is continuously formed from the front side non-compression portion 45 (at the front end side) (which will be described later). It is preferable that an outer diameter of the inclined portion 441 at the front end is substantially the same as a length (distance) between opposing sides of a compressor (die: not illustrated) that compresses the compression portion 44. In other words, it is preferable that a size of the inclined portion 441 before compression is substantially retained as the outer diameter of the inclined portion 441 at the front end after compressing the compression portion 44. With this, inordinate compressive force can be suppressed from acting on the core portion 92 at the front end of the compression portion 44, and collapse of the core portion 92 can be suppressed at the front end of the compression portion 44.

It is preferable that a length "d" of the inclined portion 441 along the axial direction of the outer sleeve 42 is greater than or equal to ½ times and less than or equal to twice of the outer diameter "D" of the outer sleeve 42 before compression (FIG. 2). The outer diameter "D" of the outer sleeve 42 means an outer diameter of a linear portion of the compression portion 44. When the length "d" of the inclined portion 441 is greater than or equal to ½ times of the outer diameter "D" of the outer sleeve 42, the inordinate compressive force is suppressed from acting on the core portion 92 at the end portion of the compression portion 44 at the opening side. When the length "d" of the inclined portion 441 is less than or equal to twice of the outer diameter "D" of the outer sleeve 42, the length "d" of the inclined portion 441 does not become too long, the outer sleeve 42 can be sufficiently compressed along the axial direction to increase holding force, and high tensile strength can be obtained. It is particularly preferable that the length "d" of the inclined portion 441 is greater than or equal to ½ times and less than or equal to 3/2 times of the outer diameter "D" of the compression portion 44.

(Non-Compression Portion)

The non-compression portion 45 is a portion other than the compression portion 44 of the outer sleeve 42 that is housed in the conductive portion compression member 5 and the main body-side connection portion 6, and is not compressed with the core portion 92 when the end portion of the core portion 92 and the outer sleeve 42 are connected. The non-compression portion 45 includes at least one of a fitting portion 451 and another portion (452). When the conductive portion compression member 5 (FIG. 1) is compressed and the end portion of the conductive portion 93 and the outer sleeve 42 are connected with the conductive portion compression member 5, the fitting portion 451 regulates positional shift of the outer sleeve 42 and the conductive portion compression member 5 in the axial direction as the outer peripheral surface of the fitting portion 451 fits with the inner peripheral surface of the conductive portion compression member 5. As the other portion of the non-compression portion 45, different from the fitting portion 451, for example, a non-fitting portion 452 that does not fit with the conductive portion compression member 5 is exemplified.

In this example, the non-compression portions 45 are formed at two positions at a front side and a rear side of the compression portion 44, and the front side and rear side non-compression portions 45 are continuously formed from the compression portion 44. The front side non-compression portion 45 is continuously formed from the front end of the inclined portion 441 at the front end of the outer sleeve 42 (opening end of the housing hole 47). The rear side (attaching portion 46 side) non-compression portion 45 is continuously formed from both of the compression portion 44 and the attaching portion 46 between the compression portion 44 and the attaching portion 46. The front side non-compression portion 45 is constituted by the fitting portion 451, and the rear side non-compression portion 45 is constituted by the non-fitting portion 452.

Figure 5:
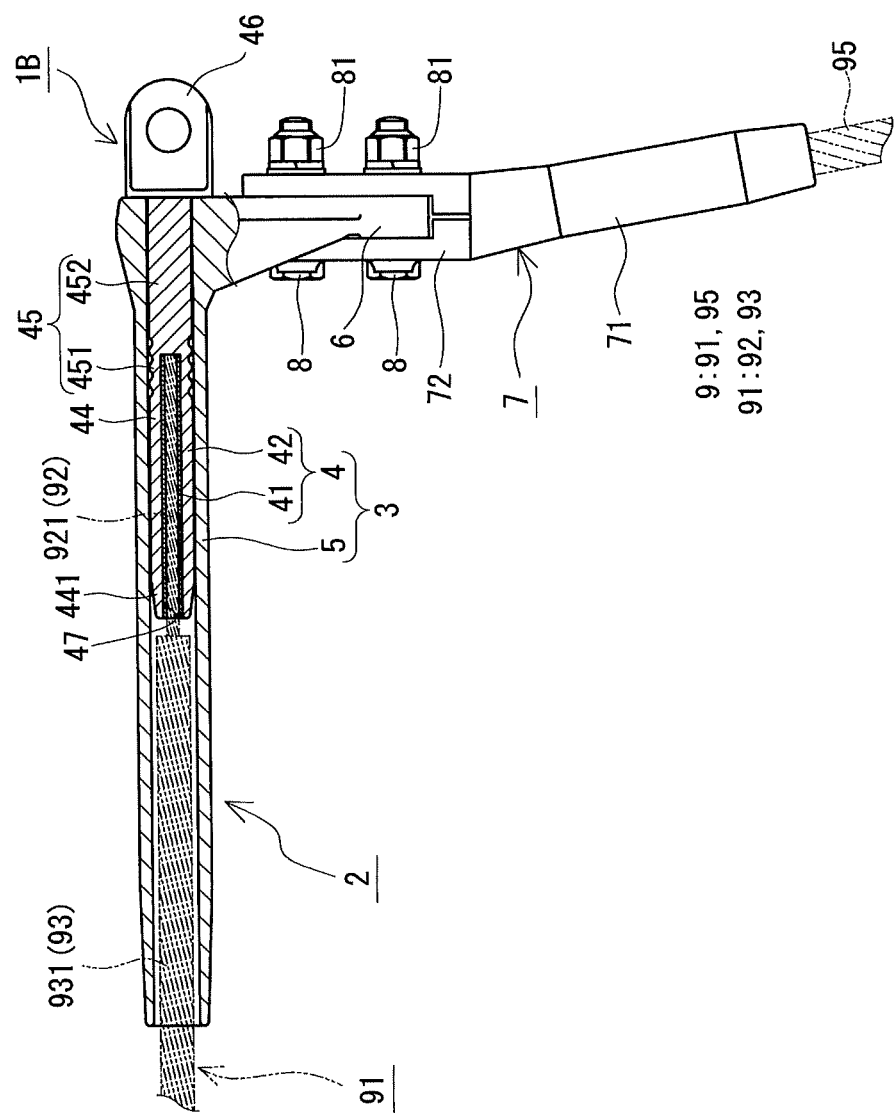
FIG. 5 is a partial cross-sectional view schematically illustrating an assembly component of a compression joint member of a second embodiment.

By forming the fitting portion 451 at the front end of the outer sleeve 42, the length of the outer sleeve 42 can be made shorter than the outer sleeve 42 (which will be described later) of the second embodiment. As illustrated in FIG. 5, when the fitting portion 451 is provided at the rear end side of the compression portion 44, as it is necessary to compress the conductive portion compression member 5 to the fitting portion 451, and further it is necessary to provide the socket-side connection portion 72 at the further rear end side from the compressed portion, the clamp main body 2 becomes longer compared with the case in which the fitting portion 451 is provided at the front end side of the compression portion 44 as illustrated in FIG. 1. By making the outer sleeve 42 shorter, a sheave can easily pass therethrough, and bending stress that acts on the clamp main body 2 when passing through the sheave can be reduced. When passing through the sheave, normally, the jumper socket 7 is not connected to the main body-side connection portion 6, and the clamp main body 2 holding the end portion of the main line 91 and is covered by a protector is passed. As it is easy to reduce bending stress as described above, when passing through the sheave, damage to the protector that covers the outer periphery of the clamp main body 2 is easily suppressed, and the protector may be omitted (may not be used). In addition, the small size compression joint structure 10A of the power-transmission line (FIG. 3) can be constructed.

The fitting portion 451 formed along the cylindrical direction of the front side non-compression portion 45 may be provided at a part of the whole circumference of the front side non-compression portion 45 along the cylindrical direction. However, it is preferable that the fitting portion 451 is formed over the whole circumference of the front side non-compression portion 45 along the cylindrical direction. With this, it is easy to regulate positional shift of the outer sleeve 42 and the conductive portion compression member 5 in the axial direction. An outer peripheral shape of the fitting portion 451 may be selectable as long as the outer peripheral surface of the outer sleeve 42 can fit with the inner peripheral surface of the conductive portion compression member 5. Here, the fitting portion 451 is formed over the whole circumference of the outer sleeve 42, and the outer peripheral shape is a corrugated shape in which a continuous convexo-concave shape is formed along the axial direction of the outer sleeve 42.

The housing hole 47 is formed in the rear side non-compression portion 45, and the length of the rear side non-compression portion 45 along the axial direction of the outer sleeve 42 may be selectable. It is preferable that the length of the rear side non-compression portion 45 is greater than or equal to that of the housing hole 47 in the rear side non-compression portion 45. An outer peripheral outline shape (cross-sectional shape) of the non-fitting portion 452 is a circular (cylindrical) shape. An outer diameter of the non-fitting portion 452 is set to be slightly larger than an outer diameter of the linear portion of the compression portion 44. The bottom of the housing hole 47 is formed in the non-fitting portion 452.

(Attaching Portion)

The attaching portion 46 connects the outer sleeve 42 to a yoke of an insulator of a steel tower. The attaching portion 46 is provided at a rear end of the outer sleeve 42. The attaching portion 46 has a ring shape. The attaching portion 46 protrudes from the opening of the main body-side connection portion 6 toward the connection target side when the compression portion 44 and the non-compression portion 45 of the outer sleeve 42 are housed in the conductive portion compression member 5 and the main body-side connection portion 6.

(Housing Hole)

The outer sleeve 42 houses the end portion of the core portion 92 and the inner pipe 41 in the housing hole 47. The length of the housing hole 47 (forming region) along the axial direction of the outer sleeve 42 is selectable depending on whether the compression order of the outer sleeve 42 is the forward-compression or the reverse-compression. For the forward-compression, the housing hole 47 (forming region) may be formed over a region from the front end of the outer sleeve 42 to the end portion of the compression portion 44 at the rear end side. For the reverse-compression, similarly as the case of the forward-compression, the housing hole 47 (forming region) may be formed from the front end of the outer sleeve 42 to the end portion of the compression portion 44 at the rear end side, or alternatively, it is preferable that the housing hole 47 (forming region) may be formed over a region from the front end of the outer sleeve 42 to the non-compression portion 45. For the latter case, the length of the housing hole 47 in the non-compression portion 45 may be greater than or equal to an extending amount of the outer sleeve 42 in the axial direction of the outer sleeve 42 when compressing the compression portion 44 by the reverse-compression. For the latter case, compared with the former case, the length of the outer sleeve 42 after compression is not too long, and the length of the outer sleeve 42 can be substantially equal to that obtained by the forward-compression. Therefore, the compression joint structure 10A of the power-transmission line (FIG. 3) is suppressed from becoming large. In particular, it is preferable that the length of the housing hole 47 in the non-compression portion 45 is substantially the same as the above described extending amount. This is described with reference to FIG. 4 in the following.

In FIG. 4, each of (a), (b) and (c) illustrates the outer sleeve 42 whose compression portion 44 is not compressed yet, and each of (d), (e) and (f) illustrates the outer sleeve 42 whose compression portion 44 is compressed. For (a) and (d), and (b) and (e), the compression order is the reverse-compression, and for (c) and (f), the compression order is the forward-compression.

For the outer sleeve 42 of all of (a), (b) and (c), the length "P1" of the compression portion 44 and the length of the housing hole 47 are set such that the compressed holding length "G" becomes equal within a range where "the compressed holding length "G"≥ the required holding length" is satisfied after compressing the compression portion 44. For example, it is set that the compressed holding length "G"=the required holding length.

When the compression portion 44 is compressed by the reverse-compression, the compression portion 44 is extended from its front end side toward its rear end side along the axial direction. On the other hand, when the compression portion 44 is compressed by the forward-compression, the compression portion 44 is extended from its rear end side toward its front end side along the axial direction. In other words, for the forward-compression, the extending direction of the compression portion 44 is a direction toward a base end side of the core portion 92, and for the reverse-compression, the extending direction of the compression portion 44 is a direction toward the front end side of the core portion 92. Meanwhile, the core portion 92 in the housing hole 47 does not substantially extend along the axial direction by the compression of the compression portion 44 regardless of the forward/reverse-compression.

For the outer sleeve 42 of (a) of FIG. 4, the housing hole 47 is formed from the front end of the outer sleeve 42 to extend through the rear side non-compression portion 45 (452). At this time, the length of the housing hole 47 in the rear side non-compression portion 45 is set to be the same as an extending amount of the outer sleeve 42 in the axial direction of the outer sleeve 42 when the compression portion 44 is compressed by the reverse-compression. The length of the housing hole 47 is longer than the length of the housing hole 47 in the outer sleeve 42 of (c) of FIG. 4 by a length of the housing hole 47 in the rear side non-compression portion 45. The length "P1" of the compression portion 44 before compression is shorter than the compressed holding length "G".

For the outer sleeve 42 of (b) of FIG. 4, the housing hole 47 is formed from the front end of the outer sleeve 42 to the rear end of the compression portion 44. At this time, the length "P1" of the compression portion 44 before compression is equal to the compressed holding length "G", which is longer than the length "P1" of the compression portion 44 before compression of the outer sleeve 42 of (a) of FIG. 4, and same as the length "P2" of the compression portion 44 after compression of the outer sleeve 42 of (d) of FIG. 4.

For the outer sleeve 42 of (c) of FIG. 4, the housing hole 47 is formed from the front end of the outer sleeve 42 to the rear end of the compression portion 44. At this time, the length "P1" of the compression portion 44 before compression is shorter than the compressed holding length "G", and is equal to the length "P1" of the compression portion 44 before compression of the outer sleeve 42 of (a) of FIG. 4.

When the outer sleeve 42 of (a) of FIG. 4 is compressed by the reverse-compression, as illustrated in (d) of FIG. 4, the length "P2" of the compression portion 44 after compression and the compressed holding length "G" become substantially the same length. At this time, a gap portion at which the core portion 92 is not inserted is formed at the rear side non-compression portion 45.

When the outer sleeve 42 of (b) of FIG. 4 is compressed by the reverse-compression, as illustrated in (e) of FIG. 4, the length "P2" of the compression portion 44 after compression becomes longer than the compressed holding length "G". At this time, a gap portion at which the core portion 92 is not inserted is formed in the compression portion 44.

When the outer sleeve 42 of (c) of FIG. 4 is compressed by the forward-compression, as illustrated in (f) of FIG. 4, the length "P2" of the compression portion 44 after compression and the compressed holding length "G" become substantially the same length. At this time, the gap portion at which the core portion 92 is not inserted is not formed in the housing hole 47.

When the outer sleeve 42 of (a) of FIG. 4 is compressed by the reverse-compression, compared with the case when the outer sleeve 42 of (b) of FIG. 4 is compressed by the reverse-compression, as illustrated in (d) and (e) of FIG. 4, the length "P2" of the outer sleeve 42 after compression can be made shorter.

When the outer sleeve 42 of (a) of FIG. 4 is compressed by the reverse-compression, compared with the case when the outer sleeve 42 of (c) of FIG. 4 is compressed by the forward-compression, as illustrated in (d) and (f) of FIG. 4, the length "P2" of the outer sleeve 42 after compression can be approximately the same length.

For the reverse-compression, by forming the housing hole 47 to extend over the non-compression portion 45 as the outer sleeve 42 of (a) of FIG. 4, even when the length "P1" of the compression portion 44 before compression is shorter than the required holding length, the length "P2" of the compression portion 44 after compression becomes the required holding length. This is because, when the outer sleeve 42 extends toward the bottom side of the housing hole 47 by the reverse-compression, as the bottom of the housing hole 47 exists in the non-compression portion 45, the core portion 92 can be inserted in the rear end side of the compression portion 44.

On the other hand, when the housing hole 47 is only formed over the compression portion 44 as the outer sleeve 42 of (b) of FIG. 4, when the compression portion 44 is compressed by the reverse-compression, it is necessary for the length "P1" of the compression portion 44 before compression to be the required holding length in order to make the compressed holding length "G" of the compression portion 44 after compression equal to the required holding length.

Thus, by forming the housing hole 47 only over the compression portion 44, when the outer sleeve 42 extends toward the bottom side of the housing hole 47 by the reverse-compression, the gap portion at which the core portion 92 is not inserted is formed at the rear end side of the compression portion 44. Thus, if the length of the compression portion 44 before compression is less than the required holding length, the required holding length cannot be obtained after compression as well.

On the other hand, for the forward-compression, even when the length "P1" of the compression portion 44 before compression is shorter than the required holding length, the length "P2" of the compression portion 44 after compression becomes the required holding length. When the outer sleeve 42 is compressed by the forward-compression, as the outer sleeve 42 extends toward the opening side of the housing hole 47, the core portion 92 is inserted over the entire length in the compression portion 44.

It is preferable that the cross-sectional shape of the housing hole 47 is a circular shape, and it is preferable that the inner diameter is constant along the axial direction. The housing hole 47 may be formed by, for example, drilling from the front end surface of the outer sleeve 42 by a drill. As the cross-sectional shape of the housing hole 47 is a circular shape, and its inner diameter is constant in the axial direction, the housing hole 47 can be easily formed.

(Conductive Portion Compression Member)

As illustrated in FIG. 1 and FIG. 3, the conductive portion compression member 5 holds the end portion of the conductive portion 93. The conductive portion compression member 5 is a cylindrical member that houses the end portion of the conductive portion 93 and a part of the core portion compression member 4, and includes an opening at a front end in the axial direction. The conductive portion compression member 5 is compressed with the end portion of the conductive portion 93 and the front side non-compression portion 45 (fitting portion 451) of the outer sleeve 42. It is allowable that the conductive portion compression member 5 is compressed with a part of the compression portion 44 of the outer sleeve 42 (front end side). However, in this example, the conductive portion compression member 5 is not compressed with the compression portion 44 of the outer sleeve 42 and the rear side non-compression portion 45. As a material of the conductive portion compression member 5, the material same as that used for the element wire 931 of the conductive portion 93, specifically, pure Al or an Al alloy may be used.

(Main Body-Side Connection Portion)

As illustrated in FIG. 1 and FIG. 3, the main body-side connection portion 6 is electrically and mechanically connected with the socket-side connection portion 72. The main body-side connection portion 6 of the example is a cylindrical member that is continuously formed from the conductive portion compression member 5 at the connection target side so as to be coaxial with the conductive portion compression member 5. In other words, a hole of the main body-side connection portion 6 communicates with a hole of the conductive portion compression member 5. The compression portion 44 of the outer sleeve 42 and the non-fitting portion 452 (non-compression portion 45) are housed in the main body-side connection portion 6. Grooves (not illustrated) that are open at an upper side and a lower side of the main body-side connection portion 6 are formed at an outer peripheral surface of the main body-side connection portion 6. Bolts 8 that are inserted in the socket-side connection portion 72 fit in the grooves, and alignment of the main body-side connection portion 6 and the socket-side connection portion 72 can be fixed by being sandwiched by these bolts 8 from the upper side and the lower side. As the conductive portion compression member 5 and the main body-side connection portion 6 that are coaxially formed, a publically known sleeve made of pure Al or an Al alloy may be used.

(Jumper Socket)

As illustrated in FIG. 1, the jumper socket 7 includes a jumper holding portion 71 that holds the jumper wire 95, and the socket-side connection portion 72 that is connected to the clamp main body 2. As a material of the jumper socket 7, pure Al or an Al alloy may be exemplified.

(Jumper Holding Portion)

The jumper wire 95 is housed in the jumper holding portion 71, and the jumper holding portion 71 holds the jumper wire 95 by being compressed with the jumper wire 95. The jumper holding portion 71 has a cylindrical shape.

(Socket-Side Connection Portion)

The socket-side connection portion 72 is electrically and mechanically connected to the main body-side connection portion 6. In this example, the socket-side connection portion 72 is bifurcated so as to sandwich an outer surface of the cylindrical main body-side connection portion 6. The bifurcated portions each has a rectangular plate shape, and has a size larger than the main body-side connection portion 6. A plurality of penetrating holes (not illustrated) through which bolts 8 can be inserted, are formed at each of the bifurcated portions. The socket-side connection portion 72 may be connected to the main body-side connection portion 6 by sandwiching the main body-side connection portion 6 by the bifurcated portions, inserting the bolts 8 in the penetrating holes of the socket-side connection portion 72 to fit in the above described grooves of the main body-side connection portion 6, and clamping by nuts (not illustrated), respectively.

(Usage)

The assembly component 1A of the compression joint member of the first embodiment can be appropriately used for an assembly component of a compression type anchor clamp that anchors a power-transmission line including a core portion that is fragile against compression such as a carbon fiber-cored aluminum cable to a steel tower.

Operation and Effect

According to the assembly component 1A of the compression joint member of the first embodiment, as the compression portion 44 includes the inclined portion 441 at the opening side of the housing hole 47, inordinate compressive force can be suppressed from acting on the core portion 92 at the opening side of the compression portion 44 when the outer sleeve 42 is compressed. Thus, even when the outer sleeve 42 is directly compressed, as collapse of the core portion 92 at the opening side of the compression portion 44 can be suppressed, high tensile strength can be obtained. In particular, by providing the inner pipe 41 between the outer sleeve 42 and the core portion 92, the inner pipe 41 is deformed when the outer sleeve 42 is compressed, and an action of the compressive force on the core portion 92 when compressing the outer sleeve 42 can be furthermore moderated. When the outer sleeve 42 is compressed, the inner pipe 41 enters the strand grooves of the core portion 92 to fill the strand grooves without collapsing the core portion 92, and the inner pipe 41 is deformed to fill spaces between the core portion 92 and the outer sleeve 42. With this, the core portion 92 and the inner pipe 41 can be closely contacted, the inner pipe 41 that enters the strand grooves can actualize a mechanically stronger bonding state with the core portion 92, and furthermore high tensile strength can be obtained.

(Compression Joint Structure of Power-Transmission Line)

A compression joint structure 10A of a power-transmission line of the first embodiment is described mainly with reference to FIG. 3 (also FIG. 4 and the like). The structure illustrated in FIG. 3 corresponds to the structure illustrated in (a) and (d) of FIG. 4. The compression joint structure 10A of the power-transmission line includes the main line 91 of the power-transmission line 9, and a compression joint member 100A that connects the end portion of the main line 91 to an insulator of a steel tower by compressing the end portion of the main line 91. In the compression joint member 100A, the compression portion of the core portion compression member 4 of the assembly component 1A of the compression joint member and the conductive portion compression member 5 are separately compressed. FIG. 3 corresponds to a state in which the core portion compression member 4 and the conductive portion compression member 5 illustrated in FIG. 1 are separately compressed. In FIG. 3, the jumper socket 7 illustrated in FIG. 1 is not illustrated.

(Power-Transmission Line)
(Main Line)

The main line 91 is installed between steel towers and supplies electric power generated at a power plant to a power-transmission network. As described above, the main line 91 includes the core portion 92 in which the seven element wires 921 each of whose main constituent is a carbon fiber are stranded, and the conductive portion 93 in which the plurality of element wires 931 each of whose main constituent is aluminum are stranded at the outer periphery of the core portion 92. As the main line 91, typically, a carbon fiber-cored aluminum cable is exemplified. The carbon fiber-cored aluminum cable includes a core portion made of a CFRP strand and a conductive portion in which a plurality of Al wires are stranded at an outer periphery of the core portion. The CFRP strand is configured by stranding a plurality of element wires made of Carbon Fiber Reinforced Plastic (CFRP strand) constituted by carbon fiber and resin. As the CFRP strand, for example, a carbon fiber composite cable (CFCC (registered trademark of TOKYO ROPE MFG.CO., LTD)) may be used. As the Al wire, a pure Al wire or an Al alloy wire may be used.

(Compression Joint Member)

The compression joint member 100A includes the core portion compression member 4 that holds the end portion of the core portion 92, and the conductive portion compression member 5 that holds the end portion of the conductive portion 93 (FIG. 3).

(Core Portion Compression Member)
(Inner Pipe)

The inner pipe 41 of the core portion compression member 4 has an adhesion surface that adheres to the core portion 92 along an outer peripheral outline of the core portion 92 at the inner peripheral surface. The adhesion surface is formed to fill the strand grooves of the core portion 92, and there is substantially no space between the adhesion surface and the core portion 92. Further, a gap portion at which the core portion 92 is not inserted in the inner pipe 41 is formed at the rear end side with respect to the adhesion surface of the inner pipe 41. A portion of the outer peripheral surface of the inner pipe 41 corresponding to the adhesion surface has a shape corresponding to the inner peripheral surface of the compression portion 44, and the outer peripheral outline shape (cross-sectional shape) of the inner pipe 41 is a circular (cylindrical) shape.

(Outer Sleeve)
(Compression Portion)

The compression portion 44 of the outer sleeve 42 includes an inner peripheral surface that adheres to the inner pipe 41 along the outer peripheral outline (circular shape) of the inner pipe 41. There is substantially no space between the inner peripheral surface of the compression portion 44 and the outer peripheral surface of the inner pipe 41. It is preferable that the end portion of the core portion 92 is housed in the entirety of the compression portion 44, and it is preferable that a gap portion at which the end portion of the core portion 92 is not housed is not formed in the compression portion 44.

The outer peripheral surface of the compression portion 44 has a shape same as an inner peripheral shape (inner peripheral shape of a die) of a compressor that compresses the compression portion 44, and a cross-sectional shape of the compression portion 44 here is a hexagonal shape, for example. Each corner portion of the hexagonal shape, except at the inclined portion 441, is substantially in parallel with the axial direction. At the inclined portion 441 formed at the front end side of the compression portion 44, each corner portion of the hexagonal shape at the outer peripheral surface is not in parallel with the axial direction, and is inclined with respect to the axial direction. In other words, each of the corner portions of the hexagonal shape formed at the inclined portion 441 is inclined with respect to the respective corner portion of the hexagonal shape formed at the linear portion of the compression portion 44. This is because the hexagonal shape is formed by compressing the inclined portion 441 included in the compression portion 44 of the assembly component 1A of the compression joint member.

A plurality of compression traces 442 ((d) of FIG. 4, for example) that are aligned in the axial direction are formed at the outer peripheral surface of the compression portion 44. Each of the compression traces 442 is substantially continuously formed in a cylindrical direction of the outer sleeve 42. It is preferable that the number of the compression traces 442 is, for example, three or more. The number of the compression traces 442 becomes "n" when the number of times of compression in the construction process is "n". In other words, when the number of the compression traces 442 is three or more, the number of times of compression in the construction process is three or more, and it is easy to suppress collapse of the core portion 92. An interval between the adjacent compression traces 442 becomes the longest at the front end side or the rear end side of the outer sleeve 42. The portion whose interval is the longest is compressed first. This is because, as the compression portion 44 at the overlapping area of the compressing zone is not substantially compressed in the second compression or further subsequent compressions, the compression trace 442 is not formed at the overlapping side. The length between each set of the compression traces 442 at the other portions has an equal interval. Here, the length between the compression traces 442 at the inclined portion 441 side is the longest.

(Non-Compression Portion)

The front side non-compression portion 45 (fitting portion 451) includes an outer peripheral surface that fits with the inner peripheral surface of the conductive portion compression member 5 without forming spaces between the conductive portion compression member 5. The rear side non-compression portion 45 (non-fitting portion 452) includes an inner peripheral surface that forms its inside a gap portion at which the core portion 92 is not inserted. A part of the end portion of the core portion 92 may be inserted in the non-fitting portion 452.

(Conductive Portion Compression Member)

The inner peripheral surface of the conductive portion compression member 5 includes a conductive portion adhesion surface that extends along and adheres to the outer peripheral outline of the conductive portion 93, and a sleeve adhesion surface that extends along and adheres to the outer peripheral outline of the outer sleeve 42. The conductive portion adhesion surface is formed to fill the strand grooves of the conductive portion 93, and spaces are not substantially formed between the conductive portion adhesion surface and the conductive portion 93. The sleeve adhesion surface includes a non-compression portion adhesion surface that adheres to the front side non-compression portion 45 (fitting portion 451) of the outer sleeve 42. The non-compression portion adhesion surface has a corrugated shape that engages with the outer peripheral surface of the fitting portion 451 (corrugated shape), and spaces are substantially not formed between the non-compression portion adhesion surface and the outer peripheral surface of the fitting portion 451. The sleeve adhesion surface may further adhere with an outer peripheral surface of a part (front end side) of the compression portion 44. Among the outer peripheral surface of the conductive portion compression member 5, portions corresponding to the conductive portion adhesion surface and the non-compression portion adhesion surface extend along an inner peripheral shape of a compressor that compresses the conductive portion compression member 5, and its cross-sectional shape is hexagonal here.

(Usage)

The compression joint structure 10A of the power-transmission line of the first embodiment can be appropriately used for an anchor structure of a power-transmission line that anchors a power-transmission line including a core portion that is fragile against compression such as a carbon fiber-cored aluminum cable to a compression joint member.

Operation and Effect

According to the compression joint structure 10A of the power-transmission line of the first embodiment, bonding strength between the power-transmission line 9 and the compression joint member 100A is high. By providing the inclined portion 441, the core portion 92 and the outer sleeve 42 can be connected without collapsing the core portion 92. In particular, as the inner pipe 41 is formed to fill the strand grooves of the core portion 92, the core portion 92 and the inner pipe 41 are mechanically strongly bonded.

(Method of Constructing Compression Joint Member)

A method of constructing the compression joint member of the first embodiment is described mainly with reference to FIG. 4 (also FIG. 1, FIG. 2 and the like). According to the method of constructing the compression joint member, by using the above described assembly component 1A of the compression joint member, the power-transmission line 9 is connected to a connection target (an insulator of a steel tower, here). The method of constructing the cdmpression joint member includes a preparation step, a core portion connecting step and a conductive portion connecting step, as follows.

(Preparation Step)

In the preparation step, the above described assembly component 1A of the compression joint member is prepared. When the core portion compression member 4 includes the inner pipe 41, preparation of the inner pipe 41 may be performed by preparing a raw material tube made of pure Al or an Al alloy, and performing heat treatment on the raw material tube. The raw material tube may be prepared by extruding, drawing, casting, cutting and the like. In other words, as the raw material tube, an extruded tube formed by extruding, a drawn tube formed by drawing, a cast tube formed by casting, a processed tube obtained by cutting the extruded tube, the drawn tube, the cast tube or a bar, and the like may be used. The Vickers hardness "Hv" of any of these raw material tubes is higher than 30. Provided that the Vickers hardness "Hv" of the raw material tube before the heat treatment is higher than 30, when preparing the raw material tube by cutting a long tube to a predetermined length, a cut edge of the raw material tube does not easily deform. Thus, the housing tube 22 with an open end whose deformation is small is easily obtained.

The inner pipe 41 whose Vickers hardness "Hv" is less than or equal to 30 is manufactured by performing a heat treatment on the raw material tube. A temperature of the heat treatment may be, although depending on a kind of pure Al or an Al alloy, for example, greater than or equal to 350° C. and less than or equal to 420° C. A period for the heat treatment may be, for example, greater than or equal to one hour and less than or equal to two hours.

(Core Portion Connecting Step)

In the core portion connecting step, the end portion of the core portion 92 and the core portion compression member 4 are connected by compressing the compression portion 44 of the outer sleeve 42 (core portion compression member 4).

First, the end portion of the core portion 92 that is exposed by partially peeling the end portion of the main line 91 is housed in the housing hole 47 of the outer sleeve 42. This may be performed by firstly housing the exposed end portion of the core portion 92 in the inner pipe 41, and housing the inner pipe 41 in the housing hole 47, or by firstly housing the inner pipe 41 in the housing hole 47, and then housing the exposed end portion of the core portion 92 in the inner pipe 41. The core portion 92 is housed in the housing hole 47 until the front end of the core portion 92 abuts a bottom of the housing hole 47.

Next, the compression portion 44 of the outer sleeve 42 is compressed. By this compression of the compression portion 44, the inner pipe 41 is deformed via the compression portion 44, and the inner pipe 41 fits in the strand grooves of the core portion 92 without collapsing the core portion 92. With this, spaces between the core portion 92 and the inner pipe 41 are filled by the inner pipe 41. The compression portion 44 is compressed such that the cross-sectional shape of the compression portion 44 becomes a hexagonal shape, for example. This compression may be performed by a commercial 100 ton compressor.

It is preferable that the compression of the compression portion 44 is separately performed for a plurality of times in the axial direction of the compression portion 44. As commercial compressors, a 100 ton compressor and a 200 ton compressor are included. A width of a compression die of a compressor is determined based on the outer diameter of the compression portion 44. For example, when the outer diameter of the compression portion 44 is 24 mm to 28 mm, a width of a compression die of a 100 ton compressor is 30 mm, and a width of a compression die of a 200 ton compressor is 60 mm. When the outer diameter of the compression portion 44 is 30 mm to 34 mm, a width of a compression die of a 100 ton compressor is 25 mm, and a width of a compression die of a 200 ton compressor is 50 mm. By using the commercial 100 ton compressor in the compression of the compression portion 44, a width of each compression can be made small, and damage to the core portion 92 is easily suppressed. The narrower the width of each compression is, the smaller the degree of deformation of the inner pipe 41 becomes, and smaller a spread of the inner pipe 41 in the axial direction becomes. Thus, force of an action in the axial direction of the core portion 92 by the deformation of the inner pipe 41 can be made small.

For example, when the outer diameter of the compression portion 44 is 26 mm, and a compression length of the housing hole 47 of the compression portion 44 is 130 mm, it is preferable that the number of times of compression (the number of divided times in the axial direction) is determined to perform 6 times of compression in total by using a 100 ton compressor with 30 mm width as follows, compared with a case in which 3 times of compression in total is performed by using a 200 ton compressor with 60 mm width.

Among the 3 times of compression in each of which the compression is performed using the 200 ton compressor with 60 mm width, 20 mm of the first compression are overlapped in the second compression, and 30 mm of the second compression are overlapped in the third compression. Among the 6 times of compression in each of which the compression is performed using the 100 ton compressor with 30 mm width, 10 mm of a preceding compression are overlapped in each of the second to sixth compressions.

Although the compression portion 44 may be compressed by the forward-compression (an order from the rear end side toward the front end side) as illustrated in (c) of FIG. 4, as illustrated in (a) of FIG. 4, the reverse-compression (from the front end side toward the rear end side) is preferable. With this, even when the length "P1" of the compression portion 44 is different, it is easy to maintain a constant compression of the inclined portion 441 of the compression portion 44, and the compression can be performed at a same state every time. By the reverse-compression, the inclined portion 441 can be compressed by the first compression. By compressing the inclined portion 441 first, the core portion 92 can be constantly compressed at the inclined portion 441, and inordinate compressive force is suppressed from acting on the core portion 92, and collapse of the core portion 92 at the front end of the compression portion 44 can be suppressed. By the reverse-compression, as illustrated in (a) of FIG. 4, when the length of the housing hole 47 is set to be a length from the front end of the outer sleeve 42 to the rear side non-compression portion 45, compared with a case in which the length of the housing hole 47 is set to be a length from the front end of the outer sleeve 42 to the rear end of the compression portion 44 as illustrated in (b) of FIG. 4, the length "P2" of the compression portion 44 after compression can be made shorter. Thus, the compression joint structure 10A of the power-transmission line (FIG. 3) can be made smaller.

It is preferable that each compressing zone partially overlaps another zone in the axial direction of the outer sleeve 42. With this, a non-compressed area that is not compressed is not formed over the axial direction of the outer sleeve 42 at the compression portion 44. A length of an overlapping area of the compressing zones may be, for example, approximately greater than or equal to ⅕ and less than or equal to ⅖ of each of the compressing zones (compression widths), furthermore, may be greater than or equal to ¼ and less than or equal to ⅓. It is preferable that a compression width (compressing zone) of a compressor is equal in each compression, and an overlapping area is also equal in each compression. Typically, the length of the overlapping area of the compressing zones is ⅓ of the compression width. At this time, when the number of times of compression is "n", "n" of the compression traces 442 ((d), (e) and (f) of FIG. 4) are formed at the outer periphery of the compression portion 44 to align in the axial direction. For example, for the reverse-compression, as illustrated in (d) of FIG. 4, one compression trace 442 is formed by the first compression, and thereafter, one compression trace 442 is formed by each compression. When the compressing zone (compression width) is equal, a length of an interval between the compression traces 442 at one portion becomes longer than those of other intervals each between the compression traces 442. The portion where the interval is longer is a portion that is compressed first. This is because, in the second compression and the compression thereafter, a compression trace 442 is not formed at an overlapping side as the compression portion 44 at the overlapping area of the compressing zone is not substantially compressed. The length between each set of the compression traces 442 at the other portions has an equal interval.

It is preferable that the compressibility ratio of the compression portion 44 is greater than or equal to 5% and less than or equal to 15%. When the compressibility ratio is greater than or equal to 5%, the core portion 92 and the compression portion 44 can be sufficiently connected. When the compressibility ratio is less than or equal to 15%, compressive force that acts on the core portion 92 does not become too large, and collapse of the core portion 92 can be easily suppressed. It is particularly preferable that the compressibility ratio is greater than or equal to 10% and less than or equal to 15%. The compressibility ratio is defined as, compressibility ratio=$((A-B)/A) \times 100$. "A" is defined as a total sectional area of the core portion 92 and the compression portion 44 before compression. "B" is defined as a total sectional area of the core portion 92 and the compression portion 44 after the compression.

(Conductive Portion Connecting Step)

In the conductive portion connecting step, by compressing the conductive portion compression member 5, the end portion of the conductive portion 93 and the core portion compression member 4 are connected with the conductive portion compression member 5. First, the core portion compression member 4 in which the end portion of the core portion 92 is connected and the end portion of the conductive portion 93 are housed in the conductive portion compression member 5. Next, the conductive portion compression member 5 is compressed. Here, an area of the conductive portion compression member 5 starting from a position corresponding to the fitting portion 451 (front side non-compression portion 45) to the front end of the conductive portion compression member 5 are compressed. By this compression, the end portion of the conductive portion 93 and the conductive portion compression member 5 are connected, and the conductive portion compression member 5 is deformed such that the inner peripheral surface of the conductive portion compression member 5 adheres to the fitting portion 451 of the outer sleeve 42. The conductive portion compression member 5 is compressed such that its cross-sectional shape becomes a hexagonal shape, for example. For this compression, a commercial compressor may be used.

(Usage)

The method of constructing the compression joint member of the first embodiment can be appropriately used for a method of constructing an anchor structure of a power-transmission line by anchoring the power-transmission line including a core portion that is fragile against compression such as a carbon fiber-cored aluminum cable to a steel tower and the like.

Operation and Effect

According to the method of constructing the compression joint member, the compression joint structure 10A of the power-transmission line in which bonding strength between the power-transmission line 9 and the compression joint member 100A is high can be constructed. By using the outer sleeve 42 having the inclined portion 441 at the end portion of the compression portion 44 at the opening side, when the compression portion 44 is compressed, compressive force moderately acts on the inclined portion 441 and inordinate compressive force is suppressed from acting on the core portion 92 at the end portion of the housing hole 47 in the compression portion 44 at the opening side. With this, collapse of the core portion 92 at the end portion of the compression portion 44 at the opening side can be suppressed and the core portion 92 and the outer sleeve 42 can be strongly connected.

Second Embodiment (Assembly Component of Compression Joint Member)

Figure 6:
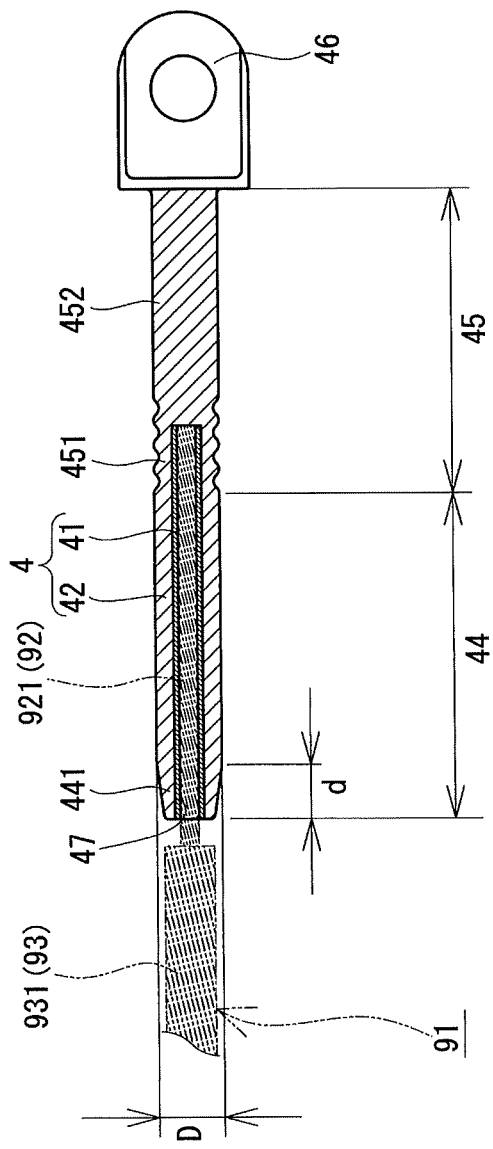
FIG. 6 is a partial cross-sectional view schematically illustrating a core portion compression member included in the assembly component of the compression joint member of the second embodiment.

With reference to FIG. 5 and FIG. 6, an assembly component 1B of a compression joint member of the second embodiment is described. For the assembly component 1B of the compression joint member of the second embodiment, different from the sheave passing short length compression type anchor clamp such as the assembly component 1A of the compression joint member of the first embodiment, a normal compression type anchor clamp is exemplified. The assembly component 1B of the compression joint member of the second embodiment is mainly different from the assembly component 1A of the compression joint member of the first embodiment in that a shape of the clamp main body 2 and a structure of the non-compression portion 45. Hereinafter, components and effects same as those of the first embodiment are not described, and points different from those of the first embodiment are mainly described.

(Clamp Main Body)

The clamp main body 2 is different from that of the first embodiment in that the main body-side connection portion 6 is formed to cross the compression holding portion 3 so that the shape becomes an L-shape, as will be described later in detail.

(Compression Holding Portion)
(Core Portion Compression Member)

Similar to the first embodiment, the core portion compression member 4 of the compression holding portion 3 includes the inner pipe 41 and the outer sleeve 42. Alternatively, the core portion compression member 4 may be constituted only by the outer sleeve 42. The inner pipe 41 of the second embodiment may be the same as the inner pipe 41 of the first embodiment.

(Outer Sleeve)
(Non-Compression Portion)

The non-compression portion 45 of the outer sleeve 42 is not formed at a front side of the compression portion 44, and only formed at a rear side of the compression portion 44. In other words, the inclined portion 441 of the compression portion 44 is formed at the front end (opening end of the housing hole 47) side of the outer sleeve 42. The non-compression portion 45 is constituted by the fitting portion 451 formed at the compression portion 44 side, and the non-fitting portion 452 formed between the fitting portion 451 and the attaching portion 46. Similarly as the front side non-compression portion 45 (see FIG. 1) of the first embodiment, the outer peripheral shape of the fitting portion 451 has a corrugated shape. The non-fitting portion 452 is a round bar having a circular cross-sectional shape.

(Attaching Portion)

When the compression portion 44 and the non-compression portion 45 are housed in the conductive portion compression member 5, the attaching portion 46 protrudes from the opening of the conductive portion compression member 5 at the connection target side toward the connection target side.

(Housing Hole)

The housing hole 47 is formed from the front end of the outer sleeve 42 to extend over the fitting portion 451 of the non-compression portion 45. The length of the housing hole 47 at the fitting portion 451 is set to be equal to or greater than the extending amount of the outer sleeve 42 in the axial direction of the outer sleeve 42 when the compression portion 44 is compressed by the reverse-compression.

(Conductive Portion Compression Member)

The conductive portion compression member 5 is a cylindrical member that houses the end portion of the conductive portion 93 and a part of the core portion compression member 4, and in this example, having openings at both ends in the axial direction. As the conductive portion compression member 5, a known sleeve made of pure Al or an Al alloy may be used.

(Main Body-Side Connection Portion)

In this example, the main body-side connection portion 6 is provided at the end portion of the conductive portion compression member 5 at the connection target side to extend along a plane that is substantially orthogonal to the axial direction of the conductive portion compression member 5. The main body-side connection portion 6 has a rectangular plate shape, and has a size corresponding to the socket-side connection portion 72. A plurality of through holes (not illustrated) through which bolts 8 are respectively inserted are formed in the main body-side connection portion 6.

(Jumper Socket)
(Socket-Side Connection Portion)

In this example, the socket-side connection portion 72 of the jumper socket 7 is bifurcated so as to sandwich the main body-side connection portion 6 having the rectangular plate shape. The socket-side connection portion 72 may be formed to have a rectangular plate shape whose size corresponds to the main body-side connection portion 6. The bifurcated portions of the socket-side connection portion 72 each has a rectangular plate shape, and has a size corresponding to the main body-side connection portion 6. A plurality of through holes (not illustrated) are formed in each of the bifurcated portions. A plurality of through holes (not illustrated) through which the bolts 8 are respectively inserted are formed in the socket-side connection portion 72. The main body-side connection portion 6 and the socket-side connection portion 72 are connected by aligning the through holes of them, inserting the bolts 8 in the through holes of them, and then clamping by nuts 81, respectively.

(Compression Joint Structure of Power-Transmission Line)

Figure 7:
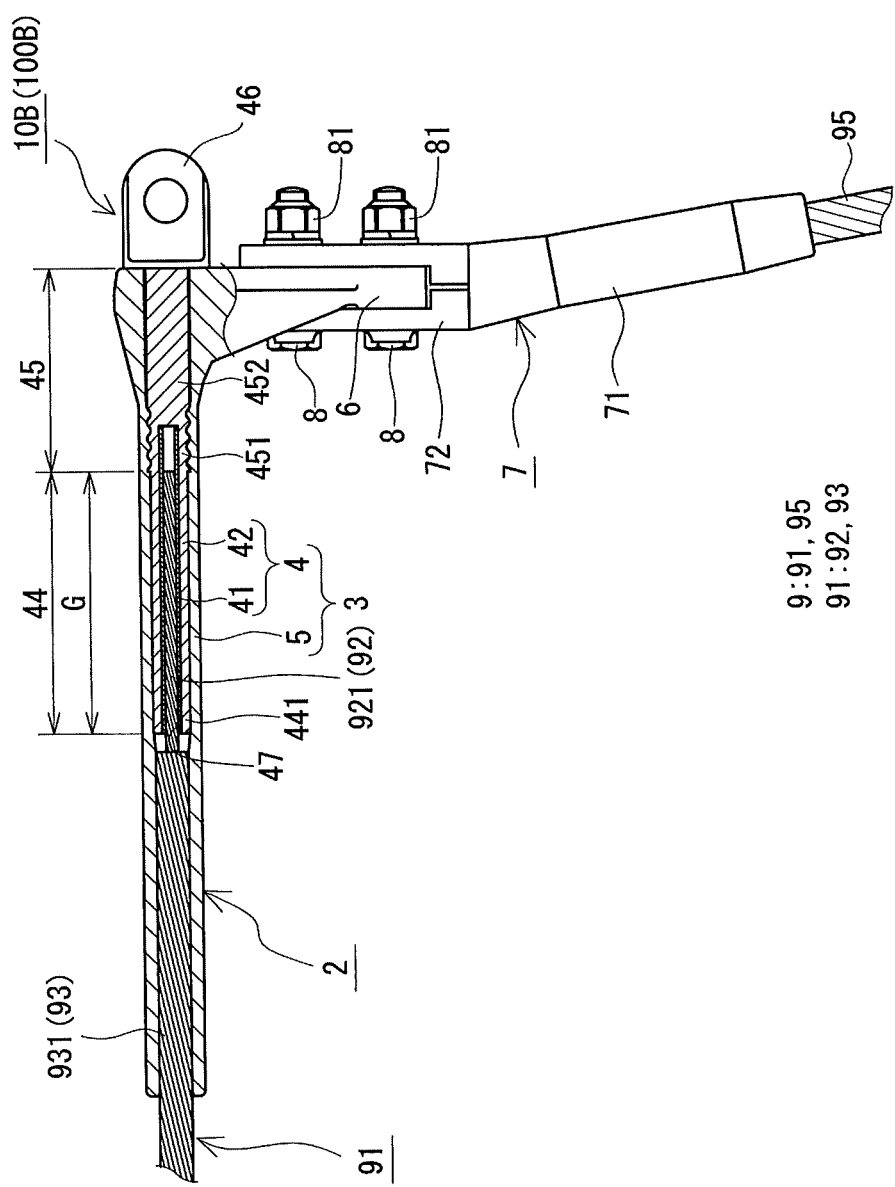
FIG. 7 is a partial cross-sectional view schematically illustrating a compression joint structure of a power-transmission line of the second embodiment.

With reference to FIG. 7, a compression joint structure 10B of the power-transmission line of the second embodiment is described. Similar to the compression joint structure 10A of the power-transmission line of the first embodiment, the compression joint structure 10B of the power-transmission line includes the power-transmission line 9 and the compression joint member 100B, and the inner peripheral surface of the conductive portion compression member 5 of the compression joint member 100B includes the conductive portion adhesion surface and the sleeve adhesion surface.

For the compression joint structure 10B of the power-transmission line, mainly, a structure of the sleeve adhesion surface is different from that of the compression joint structure 10A of the power-transmission line of the first embodiment. FIG. 7 illustrates a state in which the core portion compression member 4 and the conductive portion compression member 5 illustrated in FIG. 5 are separately compressed.

(Outer Sleeve)

(Non-Compression Portion)

The fitting portion 451 of the non-compression portion 45 includes an inner peripheral surface that forms a gap portion at which the core portion 92 is not inserted. A part of the end portion of the core portion 92 may be inserted in the fitting portion 451.

(Conductive Portion Compression Member)

The conductive portion compression member 5 includes a linear portion whose outer diameter is constant, and a diameter expanding portion whose outer diameter expands toward the end portion at the attaching portion 46 side. The linear portion is a compressed region, and the diameter expanding portion is a region that is not compressed. The inner peripheral surface of the linear portion includes the sleeve adhesion surface in addition to the conductive portion adhesion surface similarly as the first embodiment. The sleeve adhesion surface of the embodiment includes the compression portion adhesion surface in addition to the non-compression portion adhesion surface, similarly as the first embodiment. The compression portion adhesion surface is constituted by a hexagonal shape that adheres along the outer peripheral outline (hexagonal) over the entire length of the compression portion 44, and spaces are substantially not formed between the compression portion adhesion surface and the outer peripheral surface of the compression portion 44. An outer peripheral surface of the linear portion corresponds to a shape of a compressor that compresses the conductive portion compression member 5, and its cross-sectional shape is hexagonal here. An inner peripheral surface of the diameter expanding portion does not adhered to the non-fitting portion 452.

Figure 8:
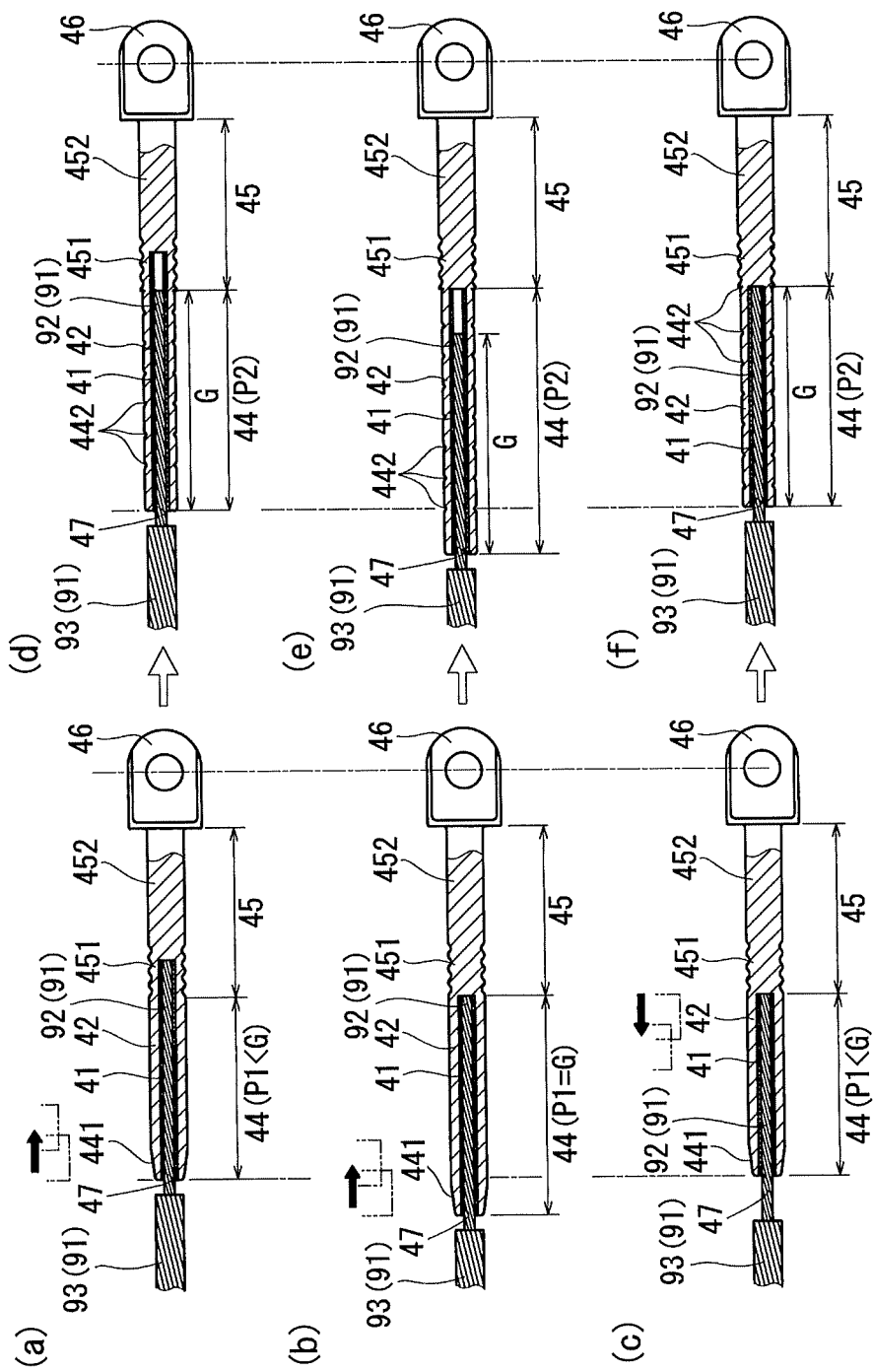
FIG. 8 is a view schematically illustrating a method of constructing the compression joint member of the second embodiment.

As illustrated in FIG. 8, the compression joint structure 10B of the power-transmission line may be formed by a method of constructing similar to the method of constructing the compression joint member of the first embodiment as illustrated in FIG. 4 by using the assembly component 1B of the compression joint member. In the compressing step of the conductive portion, among the conductive portion compression member 5, a region from outside of the fitting portion 451 to the front end of the conductive portion compression member 5 is compressed.

Third Embodiment (Assembly Component of Compression Joint Member)

Figure 9:
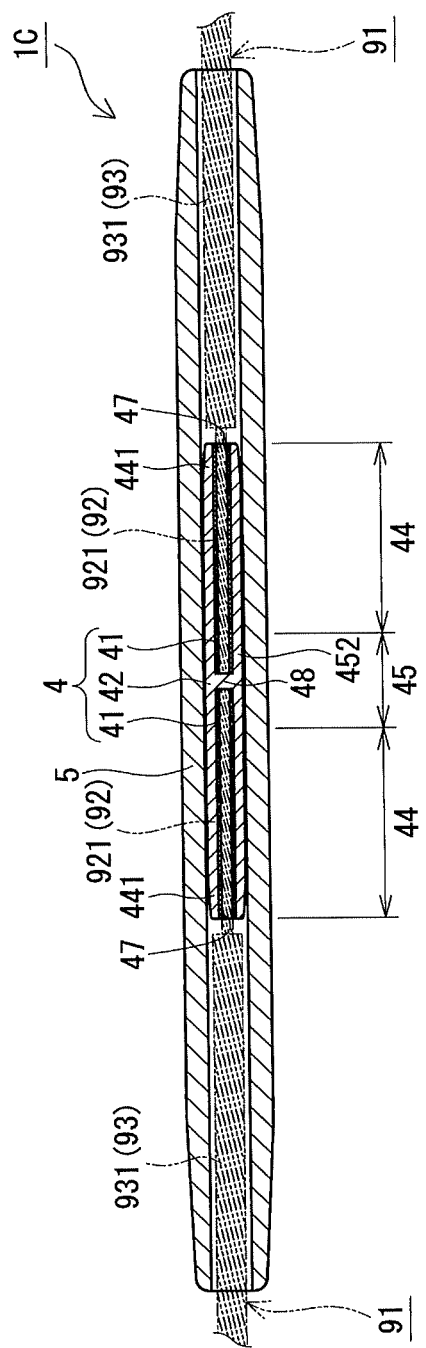
FIG. 9 is a partial cross-sectional view schematically illustrating an assembly component of a compression joint member of a third embodiment.
Figure 10:
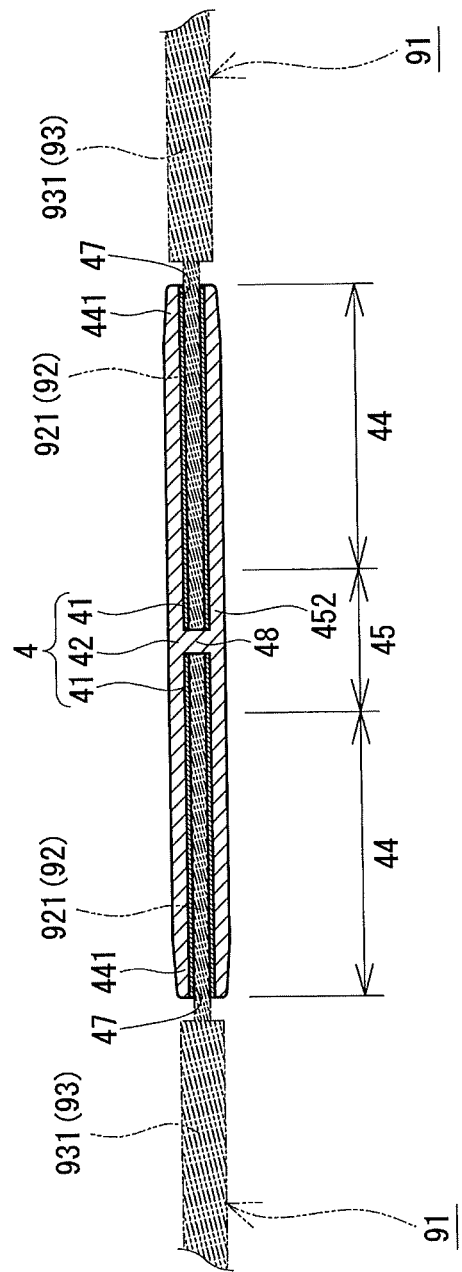
FIG. 10 is a partial cross-sectional view schematically illustrating a core portion compression member of the assembly component of the compression joint member of the third embodiment.

With reference to FIG. 9 and FIG. 10, an assembly component 1C of a compression joint member of the third embodiment is described. The connection target of the power-transmission line 9 of the assembly component 1C of the compression joint member of the third embodiment is not an insulator of a steel tower as the first embodiment or the second embodiment, and the assembly component 1C of the compression joint member of the third embodiment is not the compression type anchor clamp as the first embodiment or the second embodiment. The connection target of the power-transmission line 9 of the assembly component 1C of the compression joint member of the third embodiment is another power-transmission line, and the assembly component 1C of the compression joint member of the third embodiment is a compression type straight sleeve. In other words, the assembly component 1C of the compression joint member is provided between the steel towers and electrically and mechanically connects the one of the power-transmission lines 9 and the other of the power-transmission lines 9. The assembly component 1C of the compression joint member includes the core portion compression member 4 and the conductive portion compression member 5.

(Core Portion Compression Member)

The core portion compression member 4 holds one of the end portions of the core portion 92 and the other of the end portions of the core portion 92. Although the core portion compression member 4 includes two inner pipes 41 and one outer sleeve 42, this may be constituted by a single outer sleeve 42. Each of the two inner pipes 41 may be the same as the inner pipe 41 of the first embodiment.

The outer sleeve 42 includes the compression portions 44 formed at both end sides, respectively, and the non-compression portion 45 formed at the center. The two housing holes 47 are formed in the outer sleeve 42 that are open at both edge surfaces, respectively. The end portion of the core portion 92 and the inner pipe 41 are housed in each of the housing holes 47. The inclined portion 441 similarly as that of the outer sleeve 42 of the first embodiment is formed at the opening side of the housing hole 47 (both ends of the outer sleeve 42) of each of the compression portions 44. The non-compression portion 45 is constituted by the non-fitting portion 452, and its outer peripheral outline (cross-sectional shape) has a circular (cylindrical) shape similarly as the linear portion of the compression portion 44. The outer diameter of the non-fitting portion 452 is substantially the same as that of the outer diameter of the linear portion of the compression portion 44. A partition portion 48 is provided in the non-fitting portion 452 which blocks communication between the two housing holes 47 and forms bottoms of the housing holes 47. Each of the housing holes 47 is formed from the front end of the outer sleeve 42 to extend over the non-compression portion 45. The length of the housing hole 47 in the non-compression portion 45 is set to be greater than or equal to an extending amount of the compression portion 44 in the axial direction of the outer sleeve 42 when the compression portion 44 is compressed from the opening side of the housing hole to the bottom side.

(Conductive Portion Compression Member)

The conductive portion compression member 5 holds one of the conductive portions 93 and the other of the conductive portions 93. The conductive portion compression member 5 is a cylindrical member that houses the entirety of the core portion compression member 4 and the end portions of the both conductive portions 93, and includes openings at both ends in the axial direction. As the conductive portion compression member 5, a known sleeve made of pure Al or an Al alloy may be used.

(Compression Joint Structure of Power-Transmission Line)

Figure 11:
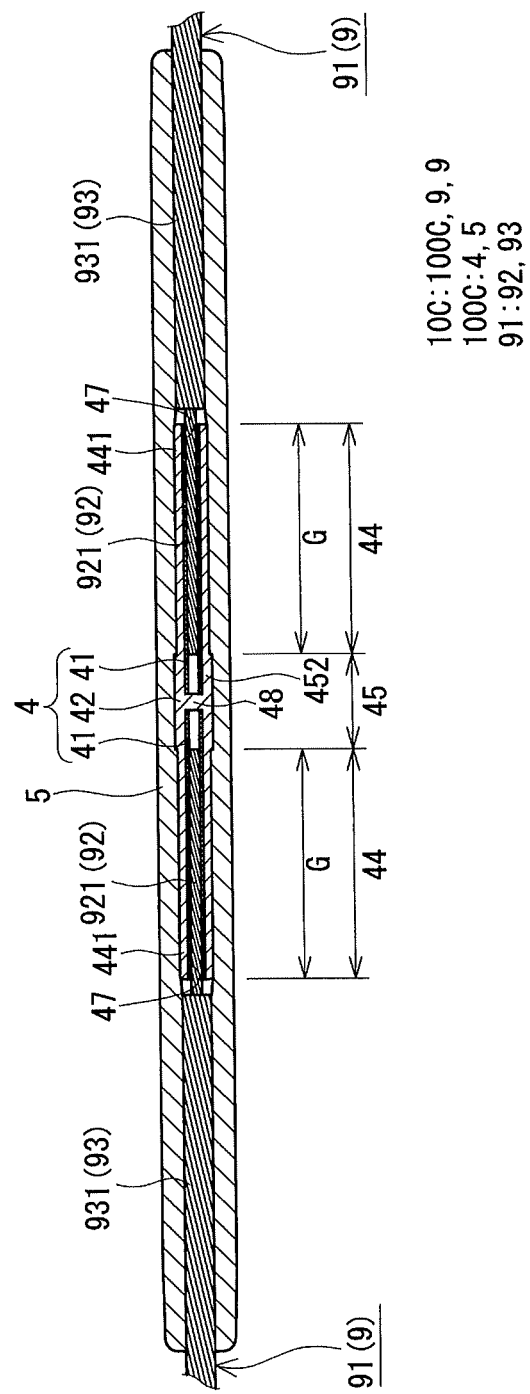
FIG. 11 is a partial cross-sectional view schematically illustrating the compression joint structure of the power-transmission line of the third embodiment.

With reference to FIG. 11, a compression joint structure 10C of the power-transmission line of the third embodiment is described. The compression joint structure 10C of the power-transmission line includes one of the power-transmission lines 9, the other of the power-transmission lines 9 and the compression joint member 100C. The compression joint member 100C includes the core portion compression member 4 that holds the end portions of the core portions 92 of the one of the power-transmission lines 9, the other of the power-transmission lines 9, and the conductive portion compression member 5 that holds the end portions of the conductive portions 93 of the two power-transmission lines 9, respectively. The compression joint member 100C is obtained by separately compressing the compression portions 44 of the core portion compression members 4 and the conductive portion compression member 5 included in the above described assembly component 1C of the compression joint member. FIG. 11 illustrates a state in which the core portion compression members 4 and the conductive portion compression member 5 illustrated in FIG. 9 are independently compressed.

The non-compression portion 45 of the outer sleeve 42 of the core portion compression member 4 includes the partition portion 48 that partitions the housing holes 47, and two inner peripheral surfaces each forms a gap portion at which the core portion 92 is not inserted.

The sleeve adhesion surface of the conductive portion-compression member 5 may further include a non-compression portion adhesion surface that adheres along the outer peripheral outline of the non-compression portion 45, in addition to the compression portion adhesion surface of the conductive portion compression member 5 of the second embodiment.

As illustrated in FIG. 12, the compression joint structure 100 of the power-transmission line may be manufactured by a method of constructing similarly as the method of constructing the compression joint member of the first embodiment illustrated in FIG. 4 by using the assembly component 1C of the compression joint member.

(Usage)

The assembly component 1C of the compression joint member of the third embodiment may be appropriately used for a compression type straight sleeve that connects power-transmission lines between steel towers. Further, the compression joint structure 100 of the power-transmission line of the third embodiment may be appropriately used as a connection structure of a power-transmission line that connects the power-transmission lines and the compression type straight sleeve. Further, the method of constructing the compression joint member of the third embodiment may be appropriately used for the method of constructing the compression joint structure of the power-transmission line by compressing and connecting the power-transmission lines.

Test Example 1

Tensile strength in the assembly component 1B of the compression joint member described above with reference to FIG. 5 based mainly on a difference in existence of the outer sleeve 42, and a difference in the length "d" (FIG. 6) of the inclined portion 441 was evaluated.

(Sample No. 1-1)

As a sample No. 1-1, one core portion 92, two inner pipes 41 and two outer sleeves 42 were prepared. As the core portion 92, a strand in which seven element wires 921, each constituted by carbon fiber and epoxy resin, were stranded was used.

(Inner Pipe)

The conditions of the inner pipe 41 were as follows.
Material: pure Al
Vickers hardness "Hv": 17.9
Thickness: 1.8 mm (1.38/2 times of the diameter ($\varphi$2.6 mm) of the element wire 921 of the core portion 92) Difference between the inner diameter of the inner pipe ($\varphi$8.4 mm) and the diameter of a circumcircle of the core portion 92 ($\varphi$7.8 mm): less than or equal to 1/10 times of the diameter of a circumcircle of the core portion 92
Length: 130 mm (Outer Sleeve)

The conditions of the outer sleeve 42 were as follows.
Material: steel
Inclined portion: provided
Length "d" of inclined portion 441: 1.7/2 times of the outer diameter "D" of the outer sleeve 42
Length of the housing hole: 130 mm Each end portion of the core portion 92 was housed in the respective inner pipe 41, and further, these were housed in the housing hole 47 of the respective outer sleeve 42. Then, each compression portions 44 of each of the outer sleeves 42 was compressed by a commercial 100 ton compressor such that its outer peripheral outline became a hexagonal shape. The compression condition was as follows.

(Compression Condition)

Compression Order: Reverse-Compression

The number of times of compression: six times (among the six times with 30 mm width, 10 mm of a preceding compression were overlapped in each of the second to sixth compressions)

Compressibility ratio: 11.9%

(Sample No. 1-2)

A sample No. 1-2 was manufactured similarly as the sample No. 1-1 except the following (a) to (d).
(a) Vickers hardness "Hv" of the inner pipe 41 was 18.
(b) The length of the inner pipe 41 was 120 mm.
(c) The length of the housing hole 47 of the outer sleeve 42 was 120 mm.
(d) The length "d" of the inclined portion 441 was 0.8/2 times of the outer diameter "D" of the outer sleeve 42.

(Sample No. 1-3)

A sample No. 1-3 was manufactured similarly as the sample No. 1-1 except the following (a) to (e).
(a) Vickers hardness "Hv" of the inner pipe 41 was 19.
(b) The length of the inner pipe 41 was 140 mm.
(c) The length of the housing hole 47 of the outer sleeve 42 was 140 mm.
(d) The length "d" of the inclined portion 441 was 2.5/2 times of the outer diameter "D" of the outer sleeve 42.
(e) The number of times of compression was seven (among the seven times with 30 mm width, 10 mm of a preceding compression were overlapped in each of the second to sixth compressions, and 20 mm of the sixth compression were overlapped in the seventh compression).

(Sample No. 1-4)

A sample No. 1-4 was manufactured similarly as the sample No. 1-1 except the following (a) to (e).
(a) Vickers hardness "Hv" of the inner pipe 41 was 18.1.
(b) The length of the inner pipe 41 was 110 mm.
(c) The inclined portion was not formed at the compression portion 44 of the outer sleeve 42.
(d) The length of the housing hole 47 of the outer sleeve 42 was 110 mm.
(e) The number of times of compression was five (among the five times with 30 mm width, 10 mm of a preceding compression were overlapped in each of the second to fifth compressions).

(Evaluation of Tensile Strength)

Tensile strength was measured by conducting a tensile test on each of the samples. Here, the outer sleeves 42 that were compressed and connected at both ends of the core portion 92 were held and pulled. In other words, the conductive portion compression member 5 of the assembly component 1B of the compression joint member was not used. As a result, the tensile strength of the sample No. 1-1 was 80.4 kN, the tensile strength of the sample No. 1-2 was 79.7 kN, the tensile strength of the sample No. 1-3 was 85.7 kN, and the tensile strength of the sample No. 1-4 was 68.1 kN. As such, it can be understood that the tensile strength of the sample Nos. 1-1 to 1-3, in which the compression portion 44 of the outer sleeve 42 includes the inclined portion 441, was larger than that of the sample No. 1-4 in which the inclined portion 441 was not provided. Further, it can be understood that the longer the length "d" of the inclined portion 441 is, the larger the tensile strength becomes.

Test Example 2

Tensile strength was evaluated based mainly on a difference in compression order of the outer sleeve 42.
(Sample No. 2-1)
A sample No. 2-1 was manufactured similarly as the sample No. 1-1 except that the Vickers hardness "Hv" of the inner pipe 41 was 25.8 and the compressibility ratio was 9.7%. In other words, for the sample No. 2-1, the compression portion 44 of the outer sleeve 42 included the inclined portion 441, and the compression order was the reverse-compression.
(Sample No. 2-2)
A sample No. 2-2 was manufactured similarly as the sample No. 2-1 except that the Vickers hardness "Hv" of the inner pipe 41 was 26.4, and the compression order was the forward-compression. In other words, for the sample No. 2-2, the compression portion 44 of the outer sleeve 42 included the inclined portion 441.
(Evaluation of Tensile Strength)
The tensile test similarly as test example 1 was conducted on each of the samples to measure the tensile strength. As a result, the tensile strength of the sample No. 2-1 was 87.5 kN and the tensile strength of the sample No. 2-2 was 75.9 kN. As such, it can be understood that the tensile strength of the sample No. 2-1 in which the compression order was the reverse-compression was larger than that of the sample No. 2-2 in which the compression order was the forward-compression.

According to the assembly component of the compression joint member, even when the core portion compression member that houses the core portion is directly compressed, high tensile strength can be obtained without collapsing the core portion.

According to the compression joint structure of the power-transmission line, bonding strength between the power-transmission line and the compression joint member is high.

According to the method of constructing the compression joint member, the compression joint structure of the power-transmission line in which bonding strength between the power-transmission line and the compression joint member is high can be formed.

In FIG. 4, FIG. 8 and FIG. 12, arrows express compression direction.

Although a preferred embodiment of the assembly component of the compression joint member, the compression joint structure of the power-transmission line and the method of constructing the compression joint member has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention. For example, the present invention includes following embodiments (1) and (2).

(1) An inclined portion (hereinafter, referred to as an outer periphery tapered portion) whose outer diameter becomes smaller toward a front end side may be provided at at least one of a position of the inner pipe corresponding to the front end of the compression portion of the outer sleeve, or the front end of the compression portion of the outer sleeve. Specifically, either one of the following (a) to (c) may be exemplified.

(a) The inner pipe includes an outer periphery tapered portion, but the outer sleeve does not include an outer periphery tapered portion.

(b) The inner pipe does not include an outer periphery tapered portion, but the outer sleeve includes the outer periphery tapered portion.

(c) Both of the inner pipe and the outer sleeve include the outer periphery tapered portions, respectively.

In the above embodiment (a), the inner pipe includes an inner peripheral surface whose inner diameter is constant in the axial direction. The compression portion of the outer sleeve includes an inner peripheral surface and an outer peripheral surface whose inner diameter and outer diameter are respectively constant in the axial direction. For the above embodiment (b), this is the same as the embodiments as described above. For the above embodiments (a) and (c), a space is formed between an outer peripheral surface of the outer periphery tapered portion of the inner pipe and an inner peripheral surface of the outer sleeve that faces the outer peripheral surface of the outer periphery tapered portion. This space is filled by deformation of the outer sleeve when the compression portion of the outer sleeve is compressed.

(2) In addition to the above described embodiment (1), an inclined portion (hereinafter, referred to as an inner periphery tapered portion) whose inner diameter becomes larger toward a front end side may be provided at at least one of a position of the inner pipe corresponding to the front end of the compression portion of the outer sleeve, or the front end of the compression portion of the outer sleeve. Specifically, either one of the following (d) to (f) may be exemplified.

(d) With either one of the above described embodiments (a) to (c), and the inner pipe includes an inner periphery tapered portion and outer sleeve does not include an inner periphery tapered portion.

(e) With either one of the above described embodiments (a) to (c), and the outer sleeve includes the inner periphery tapered portion.

(f) With either one of the above described embodiments (a) to (c), and both of the inner pipe and the outer sleeve include inner periphery tapered portions, respectively.

According to the above embodiments (1) and (2), when the outer sleeve is compressed, compressive force moderately acts on the inclined portion. Thus, inordinate compressive force is suppressed from acting on the core portion at a position of the core portion corresponding to the inclined portion. With this, collapse of the core portion at the inclined portion can be suppressed, and the core portion and the core portion compression member can be strongly connected.

Further, for example, the assembly component of the compression joint member may be appropriately used for an assembly component of a prefabricated joint compression type anchor clamp.

Various aspects of the subject-matter described herein are set out non-exhaustively in the following numbered clauses:
(Clause 1)
An assembly component of a compression joint member that connects a power-transmission line to a connection target, the power-transmission line including
a core portion in which a plurality of element wires each of whose main constituent is carbon fiber are stranded, and
a conductive portion in which a plurality of element wires each of whose main constituent is aluminum are stranded at an outer periphery of the core portion,
the assembly component of the compression joint member including:
a core portion compression member including a housing hole that houses an end portion of the core portion, and a compression portion that is compressed for compressing and connecting the end portion of the core portion housed in the housing hole; and
a conductive portion compression member that houses an end portion of the conductive portion and the core portion compression member, and is to be compressed with the end portion of the conductive portion and the core portion compression member,
wherein the compression portion includes an inclined portion provided at an opening side of the housing hole and whose inner diameter becomes larger toward the opening side of the housing hole.

According to the structure of the clause 1, the compression joint structure of the power-transmission line in which bonding strength between the power-transmission line and the compression joint member is high can be constructed. By using the core portion compression member including the inclined portion at the end portion of the compression portion at the opening side, when the compression portion is compressed, compressive force moderately acts on the inclined portion. Thus, inordinate compressive force can be suppressed from acting on the core portion at the end portion of the housing hole of the compression portion at the opening side. With this, collapse of the core portion at the end portion of the compression portion at the opening side can be suppressed, and the core portion and the core portion compression member can be strongly connected.

The core portion compression member that holds the end portion of the core portion may be configured by a single member, or may be configured by a plurality of members. The core portion compression member may include the inner pipe that houses the end portion of the core portion, and the outer sleeve that includes the compression portion and that houses the end portion of the core portion with the inner pipe, or may not include the inner pipe and may be configured only by the outer sleeve including the compression portion. The inclined portion may be formed at a position of the inner pipe corresponding to the front end of the compression portion of the outer sleeve such that the inner diameter becomes larger toward the front end side. In such a case, the inner pipe has an outer peripheral surface whose outer diameter is constant in the axial direction. The inclined portion may be formed at the front end of the compression portion of the outer sleeve such that the inner diameter becomes larger toward the front end side (opening side of the housing hole). In such a case, the compression portion includes an outer peripheral surface whose outer diameter is constant in the axial direction. The inclined portions may be formed at both of the inner pipe and the outer sleeve. When the outer sleeve is compressed, compressive force moderately acts on the inclined portion. Thus, inordinate compressive force can be suppressed from acting on the core portion at a position corresponding to the inclined portion. With this, collapse of the core portion at the position corresponding to the inclined portion can be suppressed, and the core portion and the core portion compression member can be strongly connected.

What is claimed is:

1. An assembly component of a compression joint member that connects a power-transmission line to a connection target,
the power-transmission line including
a core portion in which a plurality of element wires each of whose main constituent is carbon fiber are stranded, and
a conductive portion in which a plurality of element wires each of whose main constituent is aluminum are stranded at an outer periphery of the core portion,
the assembly component of the compression joint member comprising:
a core portion compression member including a housing hole that houses an end portion of the core portion, a non-compression portion and a compression portion that is compressed for compressing and connecting the end portion of the core portion housed in the housing hole; and
a conductive portion compression member that houses an end portion of the conductive portion and the core portion compression member, and is to be compressed with the end portion of the conductive portion and the core portion compression member,
wherein the non-compression portion is provided at a tip of the core portion compression member at an opening side of the housing hole, the compression portion is provided more inside relative to the non-compression portion in a longitudinal direction of the core portion compression member, and the compression portion includes an inclined portion provided at the opening side of the housing hole and whose outer diameter becomes smaller toward the opening side of the housing hole,
wherein the length of the inclined portion is greater than or equal to ½ of an outer diameter of the core portion compression member and less than or equal to twice of the outer diameter of the core portion compression member,
wherein the compression portion includes three or more compression traces formed to align in an axial direction of the compression portion, and
wherein an interval between adjacent compression traces of the compression portion is the longest at the inclined portion side.

2. The assembly component of the compression joint member according to claim 1, wherein the core portion compression member includes a fitting portion, provided at the opening side of the housing hole with respect to the compression portion, that fits with the conductive portion compression member by the compression of the conductive portion compression member.

3. The assembly component of the compression joint member according to claim 1, wherein the core portion compression member includes the second non-compression portion, provided at an opposite side of the opening side of the housing hole such that the compression portion is interposed between the opening side of the housing hole and the second non-compression portion, that is not compressed with the end portion of the core portion.

4. The assembly component of the compression joint member according to claim 3,
wherein the housing hole is continuously formed from a front end of the core portion compression member to extend over the second non-compression portion, and wherein a length of the housing hole in the second non-compression portion is longer than or equal to an extending amount of the core portion compression member in the axial direction when the compression portion is compressed from the opening side.

5. The assembly component of the compression joint member according to claim 1, wherein the core portion compression member further includes a fitting portion provided at the non-compression portion so as to contact an inner periphery of the conductive portion compression member.

6. A method of constructing a compression joint member, comprising:
    preparing the assembly component of the compression joint member according to claim 1;
    connecting an end portion of the core portion that is exposed by partially peeling an end portion of the power-transmission line with the core portion compression member by housing the end portion of the core portion in the housing hole of the core portion compression member and compressing the compression portion of the core portion compression member;
    connecting an end portion of the conductive portion and the core portion compression member with the conductive portion compression member by housing the core portion compression member to which the end portion of the core portion is connected and the end portion of the conductive portion in the conductive portion compression member, and compressing the conductive portion compression member; and
    connecting the power-transmission line to a connection target by using the assembly component of the compression joint member, the power-transmission line including a core portion in which a plurality of element wires each of whose main constituent is carbon fiber are stranded, and a conductive portion in which a plurality of element wires each of whose main constituent is aluminum are stranded at an outer periphery of the core portion.

7. The method of constructing the compression joint member according to claim 6, wherein in the connecting the end portion of the core portion, the core portion compression member is compressed for a plurality of times from the inclined portion side in the axial direction of the core portion compression member.

8. The method of constructing the compression joint member according to claim 6, wherein a compressibility ratio in the connecting the end portion of the core portion is greater than or equal to 5% and less than or equal to 15%.

9. A compression joint structure of a power-transmission line comprising:
    a power-transmission line including
        a core portion in which a plurality of element wires each of whose main constituent is carbon fiber are stranded, and
        a conductive portion in which a plurality of element wires each of whose main constituent is aluminum are stranded at an outer periphery of the core portion; and
    a compression joint member that connects an end portion of the power-transmission line at which the core portion is exposed from the conductive portion with a connection target by compressing the end portion,
    wherein the compression joint member includes
        a core portion compression member including a non-compression portion that is not plastically deformed by the compression and a compression portion that is plastically deformed by the compression, and holds the end portion of the core portion in the compression portion, and
        a conductive portion compression member that holds an end portion of the conductive portion with the core portion compression member that holds the end portion of the core portion,
    wherein the non-compression portion is provided at a tip of the core portion compression member at an opening side of the housing hole, the compression portion is provided more inside relative to the non-compression portion in a longitudinal direction of the core portion compression member, and the compression portion includes an inclined portion provided at a front end side of the core portion compression member and whose outer diameter becomes smaller toward the front end side,
    wherein the length of the inclined portion is greater than or equal to ½ of an outer diameter of the core portion compression member and less than or equal to twice of the outer diameter of the core portion compression member,
    wherein the compression portion includes three or more compression traces formed to align in an axial direction of the compression portion, and
    wherein an interval between adjacent compression traces of the compression portion is the longest at the inclined portion side.

10. The compression joint structure of the power-transmission line according to claim 9, wherein the core portion compression member includes a fitting portion, provided at the front end side with respect to the compression portion, that fits with an inner peripheral surface of the conductive portion compression member.

11. The compression joint structure of the power-transmission line according to claim 9, wherein the core portion compression member includes a second non-compression portion, provided at an opposite side of the front end side such that the end portion of the core portion is interposed between the front end side and the second non-compression portion, and wherein the second non-compression portion does not adhere to the core portion.

12. The compression joint structure of the power-transmission line according to claim 11, wherein the second non-compression portion includes an inner peripheral surface that forms a gap portion through which the front end of the core portion is not inserted.

* * * * *